United States Patent
Hyman

(10) Patent No.: US 9,908,110 B2
(45) Date of Patent: Mar. 6, 2018

(54) METHODS OF PREPARATION AND FORMING SUPPORTED ACTIVE METAL CATALYSTS AND PRECURSORS

(71) Applicant: IGTL TECHNOLOGY LTD, Aberdeenshire (GB)

(72) Inventor: Richard Hyman, Aberdeenshire (GB)

(73) Assignee: IGTL TECHNOLOGY LTD., Aberdeenshire (GB)

( * ) Notice: Subject to any disclaimer, the term of this patent is extended or adjusted under 35 U.S.C. 154(b) by 299 days.

(21) Appl. No.: 14/351,920

(22) PCT Filed: Oct. 22, 2012

(86) PCT No.: PCT/EP2012/070897
§ 371 (c)(1),
(2) Date: Apr. 15, 2014

(87) PCT Pub. No.: WO2013/057319
PCT Pub. Date: Apr. 25, 2013

(65) Prior Publication Data
US 2014/0303266 A1    Oct. 9, 2014

(30) Foreign Application Priority Data

Oct. 21, 2011 (EP) ..................................... 1118228
Oct. 19, 2012 (GB) ................ PCT/GB2012/000803

(51) Int. Cl.
| | |
|---|---|
| B01J 23/02 | (2006.01) |
| B01J 29/80 | (2006.01) |
| B01J 29/14 | (2006.01) |
| B01J 37/18 | (2006.01) |
| C10G 2/00 | (2006.01) |
| B01J 35/00 | (2006.01) |
| B01J 29/40 | (2006.01) |
| B01J 37/03 | (2006.01) |
| B01J 37/02 | (2006.01) |

(52) U.S. Cl.
CPC ............ *B01J 29/80* (2013.01); *B01J 29/146* (2013.01); *B01J 35/0006* (2013.01); *B01J 37/18* (2013.01); *C10G 2/334* (2013.01); *B01J 29/40* (2013.01); *B01J 37/0207* (2013.01); *B01J 37/035* (2013.01); *B01J 2229/186* (2013.01); *B01J 2229/38* (2013.01); *B01J 2229/42* (2013.01); *B01J 2523/00* (2013.01)

(58) Field of Classification Search
CPC . C07C 27/00; B01J 2229/186; B01J 2229/38; B01J 2229/42; B01J 29/146; B01J 29/40; B01J 29/80; B01J 35/0006; B01J 37/0207; B01J 37/035
USPC ........... 518/713; 502/79, 300, 304, 331, 344
See application file for complete search history.

(56) References Cited

U.S. PATENT DOCUMENTS

| | | |
|---|---|---|
| 4,113,658 A | 9/1978 | Geus |
| 4,192,777 A | 3/1980 | McVicker et al. |
| 4,199,478 A | 4/1980 | Mantovani et al. |
| 4,552,855 A | 11/1985 | Ozin et al. |
| 4,607,020 A | 8/1986 | Soled et al. |
| 4,618,597 A | 10/1986 | Fiato et al. |
| 4,622,308 A | 11/1986 | Koikeda et al. |
| 4,636,378 A | 1/1987 | Pastor et al. |
| 5,194,244 A | 3/1993 | Brownscombe et al. |
| 5,401,385 A | 3/1995 | Schmidt et al. |
| 5,952,540 A | 9/1999 | Lee et al. |
| 6,602,922 B1 | 8/2003 | Davis et al. |
| 6,653,357 B1 | 11/2003 | Espinoza et al. |
| 6,733,828 B2 | 5/2004 | Chao et al. |
| 6,787,577 B2 | 9/2004 | Davis et al. |
| 7,078,364 B2 | 7/2006 | Haw et al. |
| 7,157,404 B1 | 1/2007 | Jun et al. |
| 7,199,077 B2 | 4/2007 | Hu et al. |
| 7,259,286 B2 | 8/2007 | Jothimurugesan et al. |
| 7,304,012 B2 | 12/2007 | Green et al. |
| 7,306,824 B1 | 12/2007 | Coker |
| 7,393,876 B2 | 7/2008 | White et al. |

(Continued)

FOREIGN PATENT DOCUMENTS

| | | |
|---|---|---|
| EP | 1222027 B1 | 7/2005 |
| EP | 2314557 A1 | 4/2011 |

(Continued)

OTHER PUBLICATIONS

International Search Report for PCT/EP2012/070897 dated Apr. 22, 2013.

(Continued)

*Primary Examiner* — My-Chau T Tran
(74) *Attorney, Agent, or Firm* — Heslin, Rothenberg, Farley & Mesiti, P.C.

(57) ABSTRACT

The invention relates to a method of preparing a supported catalyst, which method comprises the steps of;

(i) providing a porous catalyst support comprising a framework having an internal pore structure comprising one or more pores which internal pore structure comprises a precipitant;

(ii) contacting the catalyst support with a solution or colloidal suspension comprising a catalytically active metal such that, on contact with the precipitant, particles comprising the catalytically active metal are precipitated within the internal pore structure of the framework of the catalyst support.

The invention also relates to supported catalysts made according to the above method, and to use of the catalysts in catalyzing chemical reactions, for example in the Fischer Tropsch synthesis of hydrocarbons.

19 Claims, 8 Drawing Sheets

(56) References Cited

U.S. PATENT DOCUMENTS

| | | | |
|---|---|---|---|
| 7,459,485 | B2 | 12/2008 | Botes et al. |
| 7,585,812 | B2 | 9/2009 | Hu et al. |
| 7,968,611 | B2 | 6/2011 | Demirel et al. |
| 2005/0222442 | A1 | 10/2005 | Lockemeyer |
| 2009/0298678 | A1 | 12/2009 | Demirel et al. |
| 2009/0314993 | A1 | 12/2009 | Zhang et al. |
| 2010/0168258 | A1* | 7/2010 | Kibby et al. .......... 518/715 |
| 2011/0251055 | A1 | 10/2011 | Fu et al. |
| 2012/0203045 | A1 | 8/2012 | Coelho Tsou et al. |

FOREIGN PATENT DOCUMENTS

| | | |
|---|---|---|
| GB | 2475492 A | 5/2011 |
| JP | 7316120 A | 12/1995 |
| JP | 2006263614 A | 10/2006 |
| JP | 2009106863 A | 5/2009 |
| WO | 2007093081 A1 | 8/2007 |
| WO | 2009051353 A2 | 4/2009 |
| WO | 2009142926 A2 | 11/2009 |
| WO | 2011042451 A1 | 4/2011 |

OTHER PUBLICATIONS

Bengoa J F et al; "Fischer-Tropsch reaction on Fe/Zeolite-L system. Structure and catalytic behavior," Materials Letters, North Holland Publishing Company, Amsterdam, Netherlands, vol. 53, No. 1-2, Mar. 1, 2002, pp. 6-11.

Suk-Hwan Kang et al; "Fischer Tropsch Synthesis using Zeolite-supported Iron Catalysts for the Production of Light Hydrocarbons," Catalysis Letters, Kluwer Academic Publishers-Plenum Publishers, NE, vol. 125, No. 3-4, Jul. 25, 2008, pp. 264-270.

Junshi Matsui et al., "Activity Decay of Potassium-Promoted Iron Oxide Catalyst for Dehydrogenation of Ethylbenzene" Applied Catalysis, vol. 51, Issue 1, pp. 203-211, Jun. 15, 1989. (Abstract Only).

Jorgen Lundin et al., "Mechanism of Potassium Loss by Desorption from an Iron Oxide Catalyst for the Styrene Process" Catalyst Letters, vol. 6, Issue 1, pp. 85-93, Jan. 1990. (Abstract Only).

Ping Wang et al., "Lithium Ion-Exchanged Zeolite Faujasite as Support of Iron Catalyst for Fischer-Tropsch Synthesis" Catalysis Letters, vol. 114, Nos. 3-4, pp. 178-184, Apr. 2007.

A.M. Alvarez et al., "Study of the Fe/zeolite-L System Part II: Co and $H_2$ Chemisorption Behavior" Applied Surface Science 165, pp. 100-108, 2000.

Bein et al., "Substrate Effect on the Growth of Iron Clusters in Y Zeolite" Surface Science 156, pp. 57-63, 1985.

Pyoung Ho Choi et al., "Hydrogenation of Carbon Dioxide Over Alumina Supported Fe—K Catalysts" Catalysis Letters 40, pp. 115-118, 1996.

J. De Graaf et al., "Preparation of Highly Dispersed Pt Particles in Zeolite Y with a Narrow Particle Size Distribution: Characterization by Hydrogen Chemisorption, TEM, EXAFS Spectroscopy, and Particle Modeling" Journal of Catalysis 203, pp. 307-321, 2001.

D. Ferdous et al. "Deactivation of Iron Based Fischer-Tropsch Catalyst-A Critical Problem" Conference: AIChE Spring Meeting and $6^{th}$ Global Congress on Process Safety, 2010.

Pierre Gallezot, "Preparation of Metal Clusters in Zeolites" Molecular Sieves, vol. 3, pp. 257-305, 2002.

B.C. Gates, "Metal Clusters in Zeolites: Nearly Molecular Catalysts for Hydrocarbon Conversion" Catalysts in Petroleum Refining and Petrochemical Industries, pp. 49-63, 1995.

J. Gaube et al., "The Promoter Effect of Alkali in Fischer-Tropsch Iron and Cobalt Catalysts" Applied Catalysis A: General 350, pp. 126-132, 2008.

B. Gillot et al., "On the Limit of Aluminum Substitution in $Fe_3O_4$ and $\gamma$-$Fe_2O_3$" Phys. Stat. Sol (a) 118, K5, 1990.

J. Haber et al., "Manual of Methods and Procedures for Catalyst Characterization" Pure & Appl. Chem., vol. 67, Nos. 8/9, pp. 1257-1306, 1995.

W. Ross Hastings et al., "Carbon Monoxide and Carbon Dioxide Hydrogenation Catalyzed by Supported Ruthenium Carbonyl Clusters. A Novel Procedure for Encapsulating $Ru_3(CO)_{12}$ Within the Pores of Na—Y Zeolite" Inorg. Chem., 27, pp. 3024-3028, 1988.

T. Ikeda et al., "$K^+$ Ion Distribution in Zeolite ZK-4's with Various Si/Al Ratios and the Contribution of $K^+$ Ions to K Cluster Formation" Microporous and Mesoporous Materials 57, pp. 249-261, 2003.

Eugenio Jaramillo et al., "New Force Field for Na Cations in Faujasite-Type Zeolites" J. Phys. Chem. B, 103, pp. 9589-9594, 1999.

Makoto Kobayashi et al., "Reduction and Sulfidation Kinetics of Cerium Oxide and Cu-Modified Cerium Oxide" Ind. Eng. Chem. Res, 41, pp. 3115-3123, 2002.

Senzi Li et al., "Promoted Iron-Based Catalysts for the Fischer-Tropsch Synthesis: Design, Synthesis, Site Densities, and Catalytic Properties" Journal of Catalysis 206, pp. 202-217, 2002.

Senzi Li et al., "Effects of Zn, Cu, and K Promoters on the Structure and on the Reduction, Carburization, and Catalytic Behavior of Iron-Based Fischer-Tropsch Synthesis Catalysts" Catalysis Letters, vol. 77, No. 4, pp. 197-205, 2001.

A. Martinez et al., "In Situ Transformation of Fischer-Tropsch Products into High-Octane Gasoline-Range Hydrocarbons by Using Hybrid Zeolite-Based Catalysts" Studies in Surface Science and Catalysis, vol. 158, pp. 1327-1334, 2005.

Masoud Salavati-Niasari et al., "From Zeolite to Host Guest Nanocomposite Materials" Advances in Diverse Industrial Applications of Nanocomoposites, pp. 341-380, 2011.

G. Maurin et al., "Theoretical Prediction of Low-Frequency Vibrations of Extra-Framework Cations in Mordenite Zeolites" Phys. Chem. Chem. Phys. vol. 6, pp. 182-187, 2004.

Sang-Sung Nam et al., "Selective Synthesis of $C_2$—$C_4$ Olefins and $C_{5+}$ Hydrocarbons over Unpromoted and Cerium-Promoted Iron Catalysts Supported on Ion Exhanged (H, K) Zeolite-Y" J. Chem. Research (S), pp. 344-345, 1999.

Richard D. Oldroyd et al., "Enhancing the Performance of a Supported Titanium Epoxidation Catalyst by Modifying the Active Center" J. Phys. Chem. B, 102, pp. 1849-1855, 1998.

Ali Nakhaei Pour et al., "Deactivation Studies of Nano-Structured Iron Catalyst in Fischer-Tropsch Synthesis" Journal of Natural Gas Chemistry, 19, pp. 333-340, 2010.

Geoffrey D. Price et al., "The Factors Influencing Cation Site-Preferences in Spinels a New Mendelyevian Approach" Phys Chem Minerals, 8, pp. 69-76, 1982.

Hannes Raebiger et al., "Origins of the p-type Nature and Cation Deficiency in $Cu_2O$ and Related Materials" Physical Reviews B, 76, 2007.

Thomas Riedel et al., "Comparative Study of Fischer-Tropsch Synthesis with $H_2$/CO and $H_2$/$CO_2$ Syngas Using Fe- and Co-Based Catalysts" Applied Catalysis A: General 186, pp. 201-213, 1999.

Notker Rosch et al., "Density Functional Model Cluster Studies of Metal Cations, Atoms, Complexes, and Clusters in Zeolites" in Host-Guest-Systems Based on Nanoporous Crystals (eds F. Laeri, F. Schilth, U. Simon and M. Wark), pp. 339-357, Wiley-VCH Verlag GmbH & Co., 2003.

Raymond E. Schaak et al., "Topochemical Synthesis of Three-Dimensional Perovskites from Lamellar Precursors" J. Am. Chem. Soc. 122, pp. 2798-2803, 2000.

Wolfgang Schmidt et al., "Nanosized Transition Metal Spinels with High Surface Areas from Zeolite Precursors" Chem. Mater. 13, pp. 607-612, 2001.

Qinghu Tang et al., "Characterizations of Cobalt Oxide Nanoparticles within Faujasite Zeolites and the Formation of Metallic Cobalt" Chem. Mater. 16, pp. 1967-1976, 2004.

Nicholas J. Turro, "Photochemistry of Organic Molecules in Microscopic Reactors" Pure & Appl. Chem., vol. 58, No. 9, pp. 1219-1228, 1986.

Jian Xu et al., "Design, Synthesis, and Catalytic Properties of Silica-Supported, Pt-Promoted Iron Fischer-Tropsch Catalysts" Topics in Catalysis, vol. 26, No. 1-4, pp. 55-71, 2003.

Xiaolong Yin et al., "Recent Developments in the Activation of Carbon Dioxide by Metal Complexes" Coordination Chemistry Reviews, 181, pp. 27-59, 1999.

(56) References Cited

OTHER PUBLICATIONS

Mehmet Zahmakiran et al., "Ruthenium(0) Nanoclusters Stabilized by a Nanozeolite Framework: Isolable, Reusable, and Green Catalyst for the Hydrogenation of Neat Aromatics Under Mild Conditions with the Unprecedented Catalytic Activity and Lifetime" J. Am. Chem. Soc. 132, pp. 6541-6549, 2010.

* cited by examiner

METHODS OF PREPARATION AND FORMING SUPPORTED ACTIVE METAL CATALYSTS AND PRECURSORS

CROSS REFERENCE TO RELATED APPLICATIONS

This application is a national stage filing under section 371 of International Application No. PCT/EP2012/070897, filed on Oct. 22, 2012, and published in English on Apr. 25, 2013, as WO 2013/057319. PCT/EP2012/070897 claims priority to PCT/GB2012/000803, filed on Oct. 19, 2012, and Great Britain application 1118228.4, filed on Oct. 21, 2011. The entire disclosures of each of the prior applications are hereby incorporated herein by reference.

FIELD OF THE INVENTION

The present invention relates to methods of preparation and forming precipitated supported active metal catalysts and precursors, and in particular (but not exclusively) to catalysts useful for carbon oxide hydrogenation processes. In particular, the invention relates to methods of preparing catalysts which comprise functionalised porous support frameworks, as found for example in zeolites, containing encapsulated catalytically active metal-containing particles, nanoparticles or clusters which may be partially or fully reduced. Aspects of the invention relate to methods of use of the catalysts so made, with particular application to the synthesis and/or conversion of various classes of hydrocarbons.

BACKGROUND TO THE INVENTION

Heterogeneous catalysts are used in a vast number of chemical and petrochemical processes. In many cases, the viability of the process depends on the successful combination of the activity of the catalyst and its selectivity and stability. A catalyst that has a high activity but exhibits poor selectivity to the desired products might not be useful to implement a chemical reaction in a commercial scale. Furthermore, a catalyst having a good activity and a good selectivity to the desired product, but showing a poor stability may not be suitable for industrial application. An optimum balance between activity, selectivity and stability must be achieved in order to consider the practical application of a catalyst.

Practical application of catalysts is also limited by economy and scalability of their preparation methods. In the scientific literature are described a number of catalysts showing acceptable performance in terms of activity, selectivity and stability, but their preparation methods are often impracticable outside a chemical laboratory or simply not economically viable in an industrial application.

Small metal or metal oxide particles having diameters in the nanoscale range are often referred to as clusters. There is an important motivation to research the catalytic properties of metal or metal oxide clusters because they differ to a great extent from the properties exhibited by bulkier particles. It is often the case that unexpected catalytic effects can be attributed to the action of clusters.

There is an advantage in supporting catalytically active metal-containing clusters on zeolitic materials. Zeolitic materials are unique supports for metal clusters because the steric restrictions imparted by their cages and pores limit the size of the clusters that can form in them. The restrictions imparted by the apertures (often termed "windows") between cages and pores limit the size of what can enter and leave the pores and cages. Thus clusters can be formed from small precursors (e.g. metal salts) in the cages and be trapped there.

The cages of zeolitic materials are small enough to exert solvent-like effects on clusters formed within them and thus the cages may induce different catalytic properties to the clusters they contain. Confinement of clusters in zeolitic material cages hinders cluster interactions and aggregation and thereby increase cluster stability.

Supported metal and metal oxide cluster catalysts can be prepared in a number of different ways. U.S. Pat. No. 4,552,855 describes a preparation method which is stated to produce zero-valent metallic clusters supported on zeolites. The deposition of the metal takes place by vaporisation of the metal at a high vacuum.

Alternative methods of producing supported metal cluster catalysts involve the impregnation of the support with metal-carbonyl complex precursors. An example of such a preparation method is described in U.S. Pat. No. 4,192,777.

U.S. Pat. No. 5,194,244 describes compositions comprising a zeolite and an alkali-metal compound wherein the sum of the amount of the alkali-metal in the compound plus any metal cation exchanged into the zeolite is in excess of that required to provide a fully metal cation-exchanged zeolite. Once the compounds are loaded into the zeolite, they are calcined to produce at elevated temperature to form a basic material that can be used as a basic catalyst, or as an adsorbent. Haber et al, in Pure and Applied Chemistry, vol 67, Nos 8/9, pp 1257-1306, discuss deposition-precipitation as a method of forming supported catalysts (section 2.1.2.2), in which an active metal is deposited onto a carrier in a precipitating solution, by slow addition or in situ formation of a precipitating agent. It is noted that for a porous support, deposition takes place preferentially in the external parts.

U.S. Pat. No. 4,113,658 describes a deposition-precipitation process for preparing materials comprising finely divided particles of metallic materials substantially homogeneously deposited on a nucleating surface such as silica. This is achieved by preparing a suspension of the nucleating surface, and crystallising metal compound onto the surface at nucleation sites from a solution comprising the metal compound.

EP 2 314 557 describes a catalyst for production of lower olefins from synthesis gas, using a catalyst in which iron has been deposited on a support that is chemically inert towards iron, such as alumina.

Promoters are chemical species added to solid catalysts or to processes involving catalysts in order to improve their performance in a chemical reaction. By itself, a promoter has little or no catalytic effect. Some promoters interact with active components of catalysts and thereby alter their chemical effect on the catalysed substance. The interaction may cause changes in the electronic or crystal structures of the active solid component. Commonly used promoters are metallic ions incorporated into metals and metallic oxide catalysts, reducing and oxidizing gases or liquids, and acids and bases added during the reaction or to the catalysts before being used.

Potassium is a well-known promoter of Group VIII-metal catalysts, commonly used in iron based High Temperature Fischer-Tropsch (HTFT) catalysts. Potassium, however, facilitates the sintering of the Group VIII metals and metal oxides. For example, U.S. Pat. No. 6,653,357 describes the effect of potassium migration in the Fischer-Tropsch process. The deactivation due to promoter migration is of special relevance if the promoter is a poison for a secondary catalytic function in bi-functional catalysts, for example in a hydrocarbon synthesis process using a hydrocarbon synthesis catalyst and an acidic catalyst, as described for example in U.S. Pat. No. 7,459,485. High loading of potassium may also lead to activity losses due to blocking of the pores of the support, and in some applications it has been shown that promotional effects deteriorate at potassium loadings exceeding 2% in weight.

Another problem associated with the preparation of supported metal catalysts is the tendency of the metals to aggregate or sinter during use, or during the any high temperature pre-treatment that may be required for activation. Such aggregation or sintering reduces the effective surface area of catalyst available for the catalysed reaction, which reduces catalyst activity It is desirable to provide a metal or metal oxide catalyst that has long term stability, and to provide a method for making such a catalyst, that avoids problems such as sintering, and also migration of active catalyst components during synthesis or use that can lead to catalyst deactivation.

SUMMARY OF THE INVENTION

According to a first aspect of the present invention, there is provided a method of preparing a supported catalyst, which method comprises the steps of;
(i) providing a porous catalyst support comprising a framework having an internal pore structure, which internal pore structure comprises a precipitant;
(ii) contacting the catalyst support with a solution or colloidal suspension comprising a catalytically active metal such that, on contact with the precipitant, particles comprising the catalytically active metal are precipitated within the internal pore structure of the framework of the catalyst support.

According to a second aspect of the present invention, there is provided a supported catalyst produced by the above method.

According to a third aspect of the present invention, there is provided a use of the supported catalyst in a catalysed process, such as a Fischer Tropsch synthesis process.

DETAILED DESCRIPTION

The internal pore structure of the framework of the catalyst support can be loaded with precipitant, either during synthesis of the catalyst support, for example by incorporating a precipitant into the catalyst support synthesis mixture or gel. Alternatively, the precipitant can be loaded by post-treatment of the catalyst support, for example through an impregnation method using a solution comprising the precipitant, such as by incipient wetness impregnation. The result is a catalyst support in which precipitant is located within the internal pore structure of the framework.

When the catalyst support is contacted with a solution or colloidal suspension comprising a catalytically active metal, the solution or colloidal suspension enters the internal porous structure of the catalyst support framework and, on contact with precipitant, precipitation or formation of insoluble particles occurs, which particles comprise the catalytically active metal. Such particles comprising the catalytically active metal are referred to herein as "clusters". Typically, such clusters have effective diameters of less than 5.0 nm, more preferably less than 2.0 nm, for example less than 1.3 nm. Typically, the maximum dimension or effective diameter of the cluster is defined by the internal pore structure of the catalyst support framework. The catalytically active metal can be dissolved in a solution, or can be a constituent of a colloid in suspension, or both.

The so-formed clusters comprising the catalytically active metal can be catalytically active in their own right, or can be treated to form an active catalyst, for example through chemical reduction, thermal treatment or by addition of further components such as co-catalysts or catalyst promoters. In one embodiment, the precipitant comprises a source of a further component, such as a co-catalyst and/or promoter.

The pores of the catalyst support advantageously comprise one or more regions or chambers where the pore diameter changes from a lower diameter to a larger diameter. Such regions or chambers are often referred to as "cages". Preferably, these cages are only accessible from the external surface of the catalyst support through lower diameter sections of the pores, such lower diameter sections often being referred to as "windows". In such embodiments, formation of the clusters of the catalytically active metal advantageously takes place within the cages, such that the clusters have effective diameters larger than the windows. This helps to prevent the clusters from migrating out of the cages during use or activation, which improves their retention within the pores of the porous catalyst support, and helps to reduce or avoid sintering. Sintering is desirably avoided, because agglomeration of clusters into larger clusters or particles reduces the overall surface area of the catalytically active metal available to reactants, which reduces catalytic activity and hence leads to deactivation of the catalyst.

The catalyst support can be crystalline or amorphous, with a preference for crystalline supports due to their well-defined pore structure and generally greater stability. The catalyst support is preferably an inorganic support, and more preferably an oxide support. Examples of oxide supports include silica, alumina, zirconia, titania, ceria, lanthanum oxide, and mixed oxides thereof, such as alumina-silica. Other examples of catalyst supports include those having extended phosphate structures, for example alumino-phosphates, a gallo-phosphates, silico-alumino-phosphates and silico-gallo-phosphates.

The catalyst support is preferably an oxide material having a zeotype structure, exemplified by zeolites. Numerous zeotype structures are known, and are described in the "Atlas of Zeolite Structures" published and maintained by the International Zeolite Association. Preferred structures are those having a 2-dimensional or 3-dimensional porous network, intersecting at cages having a diameter larger than that of the pores. Examples of zeotype structures having such a 2-dimensional and 3-dimensional pore configuration include CHA, FAU, BEA, MFI, MEL and MWW. 3-dimensional pore structures are most preferred, as this tends to favour improved diffusion of reactants and products when the catalysts are used for catalysing chemical reactions.

For oxide materials, the pore "windows" are often defined by the number of so-called "T" atoms that form the circumference of the pore or pore/cage opening. A "T" atom is a non-oxygen atom in the framework of the oxide support. For example, in an aluminosilicate material, the "T" atoms are aluminium and silicon, and in an aluminophosphate the "T" atoms are aluminium and phosphorus. Preferably, in at least 1 dimension of the internal pore structure, the pore windows are formed by a ring of at least 10 "T" atoms, more preferably at least 12 "T" atoms. Preferred structures are FAU, BEA, MFI and MWW.

Catalyst supports which are or comprise a zeolite framework provide high surface area for supporting catalytically active metal-containing clusters and enable an ordered dispersion of clusters of an even size and distribution throughout the pore structure of the catalyst support.

The framework of the catalyst support can be made up of charged framework structures. For example, aluminosilicate and silico-alumino phosphate zeolite structures have a negative charge that requires balancing with an extra-framework cation. Using catalyst supports that have such a negatively charged framework can be advantageous, as the charge-balancing cation can be selected to be a further component of the final active catalyst, for example a co-catalyst or catalyst promoter, which interacts with or can form part of the clusters comprising the catalytically active metal.

Where the catalyst support comprises a negatively charged framework, for example aluminosilicate materials, in particular aluminosilicate zeolites, the framework of the support advantageously comprises an intermediate or low silicon to aluminium molar ratio. In this context, intermediate or low silicon to aluminium molar ratio means a ratio of less than 10 (i.e. a $SiO_2:Al_2O_3$ ratio of less than 20). Preferably, the silicon:aluminium molar ratio is in the range of approximately 2 to 5 (i.e. a $SiO_2:Al_2O_3$ ratio in the range of 4 to 10). In a particular embodiment of the invention the Si:Al ratio is approximately 2.4 (i.e. a $SiO_2:Al_2O_3$ ratio of approximately 4.8). In alternative embodiments of the invention the silicon:aluminium ratio in the zeolite is less than 2 (i.e. a $SiO_2:Al_2O_3$ ratio of less than 4), and in one embodiment the silicon:aluminium ratio in the zeolite is approximately 1.0 (i.e. a $SiO_2:Al_2O_3$ ratio of approximately 2), such as zeolite X.

By providing a catalyst support with a low or intermediate silica content, the zeolite framework has an improved capacity for ion exchange with charge-balancing cations. Where the charge-balancing cations can act as co-catalyst or catalyst promoters, then increased loading of such co-catalysts or promoters can be achieved.

Zeolite frameworks are microporous frameworks that comprise a plurality of cages linked by windows. Preferably, the cages of the zeolite framework have a largest dimension which is greater than the diameter of a window that provides access to the cage.

The largest dimension of the cage of the zeolite framework may be greater than 5 angstroms (0.5 nanometers). Preferably, the largest dimension of the cage of the zeolite framework is greater than 10 angstroms (1 nanometer), and more preferably is approximately 13 angstroms (1.3 nanometers). In a preferred embodiment of the invention the catalyst support is or comprises a faujasite zeolite, which may be zeolite-Y or zeolite-X. In the faujasite (FAU) structure the cages are only accessible through windows whose maximum dimensions are less than the maximum dimensions of the cages. Another example of a desirable structure is the MWW structure, as found for example in the zeolite MCM-22.

Preferably, the catalyst support has pores which comprise cages and windows, for example in zeotype or zeolite structures, wherein the clusters comprising catalytically active metal are formed in the cages to a kinetic diameter which is greater than the diameter of the windows that provides access to the cage. By preparing clusters with maximum dimensions larger than the dimensions of the windows, aggregation or sintering of the metal oxide clusters is mitigated or prevented even if the catalyst is subjected to high reaction temperatures.

The diameter of the window that provides access to the cage is typically greater than 2 angstroms (0.2 nanometers). Preferably, the largest dimension of the window of the zeolite framework is greater than 4 angstroms (0.4 nanometers), and more preferably is approximately 7.4 angstroms (0.74 nanometers). Preferably, the clusters comprising catalytically active metal have a kinetic diameter which is greater than 2 angstroms (0.2 nanometers), preferably greater than 4 angstroms (0.4 nanometers), and more preferably greater than 7.4 angstroms (0.74 nanometers).

For catalytic applications where slurry or fluidised bed processes are employed, the catalyst support should preferably be selected from those with good attrition resistant properties. Zeolites, in particular aluminosilicate zeolites such as zeolite Y, are beneficial in this regard.

The supported catalyst produced according to the presently claimed method can be used to catalyse chemical reactions. By having high dispersion of clusters throughout the internal pore structure of the catalyst support framework, the surface area of catalytically active metal exposed to reactants is high, which benefits catalyst turnover numbers and reactant conversion. In addition, by encapsulating the clusters of catalytically active metal within the pores, migration of the clusters and sintering, resulting in the formation of larger clusters with lower overall surface area, is avoided. This in turn reduces catalyst deactivation and improves catalyst lifetime. The encapsulation and reduced sintering is enhanced where the porous structure comprises cages of increased diameter, as described above, such pore structures being exemplified by the zeotype structures. Preferred structures comprise a 2-dimensional or 3-dimensional network of pores intersecting at cages of increased diameter compared to the cage "windows". An interconnected porous structure is advantageous, as improved dispersion of the catalytically active metal in the solution or colloidal suspension is achieved through more efficient diffusion through the pores. In addition, less blocking of the porous network will take place if some blocking of pores by clusters takes place during synthesis of the supported catalyst, or if any sintering does occur during use.

The catalytically active metal is added to the catalyst support as a solution or colloidal suspension, which diffuses into the internal pore structure of the catalyst support framework. Where a colloidal suspension containing catalytically active metal in the suspended phase is used, the effective diameter of the suspended phase/colloidal particles should be sufficiently low to allow ingress through the pore openings or windows and into the internal porous structure. However, because the particles contained within a colloidal suspension would be slower at diffusing through a restricted network of pores, and would have a greater potential to cause blocking of the pore structure compared to a completely dissolved catalytically active metal, a solution of catalytically active metal is preferred.

Other components of the catalyst can also be added to the internal pore structure of the catalyst support framework in a similar way, i.e. by a solution or colloidal suspension. They can be incorporated separately to the catalytically active metal, or as part of the same solution or colloidal suspension.

Where the catalyst support framework is anionic in nature, for example in aluminosilicates and aluminosilicate zeolites, ion exchange can be performed to replace the charge-balancing cations, for example cations of at least one group I or group II metal. Such a process is often termed "ion exchange", and preferably the ion exchange comprises providing the replacement cation by exposing the zeolite framework to a salt solution comprising the replacement cation. The salt solution may be aqueous Alternatively or in addition the solvent may comprise an organic solvent, such as an alcohol. The cation is preferably a promoter or co-catalyst of the catalytically active metal, and in a preferred embodiment is selected from the group consisting of lithium, sodium, potassium, rubidium, caesium, magnesium, calcium, strontium and barium. Preferably the cation is provided in the form of a salt solution, such as a carbonate and most preferably a bicarbonate solution. The use of carbonates, and bicarbonates in particular, has been found to cause less disruption to the catalyst support framework. In the case of aluminosilicas and aluminosilicate zeolites, for example, the use of carbonate and bicarbonate tends to reduce dealumination of the framework, which would otherwise result in disruption to the framework structure, and the formation of extra-framework particles of alumina which can block the pores, and reduce the capacity for catalytically active metal-containing clusters. By disrupting the framework structure, the ability to reduce sintering is also negatively affected.

According to one embodiment of the present invention, the catalyst support is or comprises an anionic zeolite framework, for example an aluminosilicate zeolite. The method may comprise performing an ion exchange using known techniques to load the framework with a cation, for example a cation of a group I or group II metal. This ion-exchange can be carried out more than once if necessary to ensure that the support framework is as fully exchanged as possible with the cation. Where the cation is a promoter or co-catalyst, this acts to increase the loading of promoter, which can benefit catalytic activity. In addition, by reducing or eliminating any protons as the counter-balancing cation on the framework, less neutralisation of a basic precipitant occurs.

In a further embodiment, a first ion exchange on the zeolite framework support is carried out to load the zeolite framework with cations of one or more group I or group II metals; and then performing a second ion exchange. The second ion exchange may increase the loading of the cation promoter in the framework. The cation loaded in the second ion exchange is preferably the same as that loaded in the first ion exchange, but may be a different cation. In a preferred embodiment of the invention the method comprises performing first, second and third ion exchanges on the zeolite framework to increase the loading of the preferred cations in the framework.

The ion exchange may comprise heating the ion-exchange solution. The ion exchange may further comprise drying and calcining the ion exchanged zeolite prior to addition or impregnation of the catalytically active metal.

Where the catalyst support comprises an anionic framework, for example in aluminosilicates and aluminosilicate zeolites, the extent of ion exchange by one or more charge balancing cations of the framework is preferably greater than 2% by weight. Preferably, the proportion of the charge balancing cations in the framework is greater than 5% by weight, and more preferably, the proportion of the charge balancing cations in the framework is greater than 10% by weight. In a particular embodiment of the invention the proportion of the charge balancing cations in the framework is greater than 12% by weight.

Incipient wetness impregnation is one way of incorporating catalytically active metals and promoter or co-catalyst metals into the internal pore structure of the catalyst support framework. Incipient wetness impregnation comprises the addition of a volume of solution containing dissolved compounds (e.g. salts) of the one or more metals equal to a calculated pore volume of the internal pore structure of the catalyst support. The incipient wetness impregnation method may comprise heating a solution to improve the dissolution of the metal compounds (e.g. salts) in the solution. Examples of suitable metal-containing salts are nitrates, sulphates, carbonates, citrates, halides, alkoxides, phenoxides, acetates, benzoates, oxalates, acetylacetonates and carboxylates. Preferred anions of the salts are those which have an effective diameter small enough to allow ingress into the internal porous structure of the catalyst support framework. Preferred anions have at least some acidic character when the salt is dissolved in an aqueous solution, which can then react effectively with a basic precipitant, such as an alkali metal carbonate or bicarbonate, to form a catalytically active metal-containing cluster. Nitrate is a particularly preferred anion.

The method typically comprises a single treatment of the catalyst support with a solution comprising catalytically active metal. Additional treatment with the same or different metals can be carried out if necessary, although this is preferably after washing the initially impregnated material, and adding further precipitant where necessary.

The technique can be thought of as a deposition-precipitation method involving precipitation of catalytically active species from a solution or colloidal suspension onto a solid support in which the precipitant (being within the internal pore structure of the catalyst support) is in the solid phase at the point of contact with the impregnating solution or liquid. In a preferred embodiment, the precipitation takes place by an acid/base reaction.

The identity of the solvent or liquid phase of the solution or colloid suspension is not particularly restricted. Its purpose is to facilitate the diffusion of the catalytically active metal through the internal pore structure of the catalyst support, and is chosen according to its ability to ensure dissolve a compound containing the catalytically active metal, or to stabilise a catalytically active metal-containing colloid such that appropriate sized colloidal particles are obtained. The solution or colloid may contain additional components, for example one or more additional catalytically active metals, components of any co-catalyst or components of any promoters. Mixtures of liquids acting as the solvent or liquid phase can be used. Water is a convenient solvent, particularly if pH control of a catalytically active metal-containing solution is required to ensure efficient precipitation of clusters within the pores of the catalyst support. However, use of other solvents/liquids and mixtures are not excluded. For example organic liquids such as alcohols, ketones, aldehydes, carboxylic acids esters and ethers can be used, either individually or in combination with another liquid.

The precipitant within the internal pore structure of the catalyst support framework causes precipitation of the catalytically active metal from the suspended colloid or solution to form clusters comprising the catalytically active metal. The precipitant is not part of the framework structure of the catalyst support, nor is it merely a charge-balancing cation of a negatively charged framework structure, for example. Typically, the precipitant is a compound that can be incorporated into the internal porous structure of the catalyst support framework, for example by being included as a non-reacting component of a synthesis gel, or by being impregnated into the internal porous structure by post-synthesis techniques such as incipient wetness impregnation. The precipitant can be, can comprise, or can be converted into a further component of the final active catalyst, for example it can function as a promoter or co-catalyst, optionally after further treatment, such as heat treatment or chemical reduction.

The precipitant is preferably included in the internal pore structure of the catalyst support at a loading of 2 wt % or more based on the dry weight of the optionally ion-exchanged catalyst support. More preferably, the loading is 5 wt % or more, and even more preferably 10 wt % or more. The more precipitant that can be included in the catalyst support internal pore structure, the greater the potential loading of catalytically active metal can be achieved.

Before contact with a solution or colloidal suspension comprising catalytically active metal, the catalyst support with the precipitant is in a dry form. Thus, where the precipitant has been added to the catalyst support by a solution-based impregnation method, then the solvent is removed before contact with catalytically active metal takes place. This ensures that the internal pore structure of the catalyst support is free of any liquid phase that could impede penetration of the catalytically active metal-containing solution or colloidal suspension into the internal pore structure, and helps to improve the efficiency and rate of precipitation of the catalytically active metal-containing clusters.

The precipitant can work via acid-base precipitation. In one example, the precipitant can be basic, such as being a carbonate or bicarbonate alkali-metal salt. When the solution or colloidal suspension comprising catalytically active metal (and optionally additional components such as other catalytically active metal, promoter and co-catlayst) contacts the basic precipitant, insoluble clusters comprising the catalytically active metal form, for example through precipitation of insoluble hydroxide or oxide species. Such precipitated clusters, can be converted to metallic clusters by a reduction process in advance of being used as a catalyst, for example by means of heating in a reducing atmosphere containing hydrogen gas.

Where the precipitant causes formation of the clusters through acid-base precipitation, the pH of the impregnating solution containing the catalytically active metal can be controlled or adjusted beforehand to optimise the extent and efficiency of precipitation within the internal pore structure. pH can be adjusted by known means, for example by addition of a suitable hydroxide, carbonate or bicarbonate salt to increase the pH of the solution or colloidal suspension containing the catalytically active metal, or through addition of a suitable acid to reduce pH. Merely as illustrative examples, for an aqueous solution or colloidal suspension, a hydroxide solution such as sodium, potassium or, preferably, ammonium hydroxide could be used to increase pH, while nitric or carbonic acid could be used to reduce the pH. In embodiments, the solution or colloidal suspension before addition to the catalyst support has a pH in the range of from about 1 to 2, for example a pH in the range of from 1.1 to 1.7. Typically, after contact with the precipitant-containing catalyst support, the pH of the solution or liquid phase of a colloidal suspension will preferably increase to a value of 4 or more, more preferably 5 or more, for example 6 or more. An additional way of controlling the pH of the resulting impregnating solution or colloidal suspension is to control the amount of basic precipitant loaded into the catalyst support, such that a higher loading will have a consequently stronger effect in increasing the resulting pH of the impregnating solution.

A further advantage of the precipitant having basic character, and of the pH of the resulting solution being 4 or more, is that it can reduce or neutralise any disruptive effects of any acidity associated with the solution or colloidal suspension comprising catalytically active metal on the catalyst support. For example, in the case of aluminosilicate zeolites, exposing such zeolites to acid solutions can be detrimental to crystallinity, resulting in the loss of framework structure. Disruption can be caused by stripping of some of the components from the framework, for example aluminium can be stripped from the framework to form extra-framework particles of alumina within the pore structure. This disrupts not only the pore structure which can reducing inhibition of sintering, but can also potentially result in blocking of the pores, which also reduces the volume of the internal pore structure that is available to form the catalytically active metal-containing clusters. Therefore, such disruption has negative consequences for the prevention of sintering, migration and/or aggregation of active catalyst products, which in turn impacts negatively on the surface area and performance of the catalyst, including its activity, selectively, and/or stability.

The use of a basic precipitant itself also mitigates such effects, by allowing the possibility of metal salt solutions with greater acidity to be used in impregnation with catalytically active metal and other components. This has the additional benefit that higher concentration solutions of metal salts and or colloidal suspensions than previously contemplated may be used if desired, which improves loading of the respective metals in the catalyst support. Where the catalyst support is anionic in nature, ensuring the anion sites are as fully exchanged as possible with charge-balancing cations, such as alkali-metal cations, also helps to mitigate any effect of acidity of any impregnating solution or liquid, and also reduces potential loss of activity of precipitant through neutralisation.

Thus, in the method according to the present invention, although a certain amount of framework disruption of the catalyst support may still occur during catalyst preparation, the invention provides for better retention of the framework structure. This is particularly advantageous in catalyst supports having crystalline, porous framework structures, such as zeolites.

Optionally, any precipitant that may be present on the external surface of particles of catalyst support is washed off before contact with the solution or colloidal suspension comprising catalytically active metal, while avoiding the removal of precipitant from within the internal pore structure, for example by avoiding repeated washing. Removing external precipitant can help to reduce the tendency for the metal clusters to be formed on the exterior surface of catalyst support particles during impregnation, facilitating precipitation of catalytically active metal-containing clusters within the internal pore structure. However, a small amount of basic precipitant on the surface can help mitigate any potential damage from an acidic impregnating solution on the external surface of the catalyst support framework.

In the case of a catalyst support having a negatively charged framework, for example an aluminosilicate zeolite, and which is subjected to ion exchange treatment, the catalyst support can be washed after ion-exchange while the zeolite support is in a partially dry, wet slurry or paste-like condition.

To illustrate the principles set out above, an example of the preparation of a supported potassium-promoted iron catalyst is now described. To prepare such a catalyst, a zeolite having an anionic framework can be used as the catalyst support, such as an aluminosilicate zeolite, which is often supplied or prepared with sodium as the charge-balancing cation. The anionic catalyst support can be fully exchanged with potassium through one or more impregnations of an aqueous potassium salt solution, such that the framework is fully charge balanced with potassium, and there remains excess potassium salt within the internal pore structure. A convenient source of potassium salt in such circumstances is potassium carbonate and/or potassium bicarbonate, as such salts are basic in character, and tend not to cause significant damage or disruption to the framework structure of the catalyst support. The excess potassium carbonate or bicarbonate can then act as a precipitant. The potassium-loaded material can be mildly washed or rinsed to remove surface traces of the potassium carbonate/bicarbonate precipitant from the external surfaces of the catalyst support, but not so much that the precipitant from within the internal pore structure is removed to any significant extent. A solution of an iron-containing salt, for example an aqueous solution of iron (III) nitrate, can then be added to the resulting potassium-modified zeolite, which results in precipitation of iron-containing clusters within the internal pore structure of the zeolite.

In some aspects and embodiments of the invention, the method may comprise forming a cation vacant metal oxide cluster. A cation vacant metal oxide cluster is an oxide material that has cation vacancies, where the potentially excess negative charge resulting from the vacancy is compensated for by an increase in oxidation state from other cations in the cluster having the capability of adopting multiple oxidation states, for example transition metal or lanthanide ions. Alternatively, as described in more detail below, the excess negative charge can be balanced by a different cation, for example a charge-balancing cation of the framework, or a cation associated with the precipitant.

The cluster can be crystalline in structure. In one embodiment, the cluster comprising the catalytically active metal is a perovskite structure of the general formula $ABO_3$ or a spinel structure of general formula $AB_2O_4$. The perovskite structure is a crystalline phase adopted by the compound $CaTiO_3$, although Ca and Ti can be replaced with other elements while maintaining the same structure type. A spinel structure is based on the structure of $MgAl_2O_4$, where the Mg and Al can similarly be replaced with other elements while maintaining the same structure. Examples of catalysts that have a perovskite structure include those described in WO2007/076257, which are useful for Fischer Tropsch reactions, and include catalysts comprising the elements K, Fe, Cu and La. Examples of catalysts having a spinel structure, and which are active towards Fischer-Tropsch reactions, include those described in U.S. Pat. No. 4,537,867, comprising iron and cobalt as metals A and B respectively, of formula $Fe_xCo_yO_4$ (x+y=3), and which can also be promoted by alkali-metal. According to the present invention, such materials of perovskite or spinel structure can be made by adding a solution comprising the catalytically active metal(s) and any promoters and co-promoters (e.g. an aqueous solution comprising dissolved Fe, Mn and/or Co salts, or an aqueous solution comprising Fe, Cu and La salts), and impregnating the support that contains a K salt as precipitant, for example in the form of a basic potassium salt, such as potassium carbonate or bicarbonate in a fully potassium-exchanged aluminosilicate zeolite, optionally washing or rinsing with water, followed by drying the impregnated material to remove any water, and calcining the dried material at high temperature, for example a temperature in the range of from 500° C. to 630° C., in an oxygen-containing atmosphere, which can result in the formation of crystalline perovskite or spinel material in the internal pore structure of the catalyst support framework. Perovskite or spinel materials can be made having cation vacancies, or cation deficiencies. Due to the low size of the clusters, and because the clusters are formed from soluble precursors, then the temperatures required to produce any such crystalline phases is typically less than methods of making the bulk crystalline structure, which often employ separate, insoluble oxide materials as the starting materials.

Different types and structures of metal oxide clusters can be produced using the method of the present invention. The overall resulting structure will be dependent not only on the identity of the metals themselves, but also on their relative ratios and their positive charges. Thus, appropriate selection of metals and their relative amounts can be used to direct the structure of the resulting metal oxide cluster.

It is hypothesised that a cation vacant (sometimes referred to as "cation deficient" or "metal deficient") metal-containing cluster will have an electrostatic interaction with cations associated with a negatively charged framework, and that this electrostatic interaction can help to mitigate or prevent migration of the charge balancing cations and the clusters, which further acts to mitigate or prevent sintering or aggregation of the clusters, particularly so in "window"/"cage" structures such as those exhibited by zeotype structures such as in zeolites. Migration and/or sintering and aggregation are generally detrimental to catalyst performance. By preventing migration of the charge balancing cations from the catalyst, and where the charge balancing cations act as promoters or co-catalyst, catalytically active metal-containing clusters can be formed with higher loadings of co-catalyst/promoter, which increases any promoting or co-catalyst effect. This is in contrast to the prior art, which teaches that excess promoter loading is detrimental to active metal particle performance, where excess promoter migrates from the catalyst support resulting in loss of activity, which may also affect other components that might be present in combination with the supported catalyst, for example a second catalyst in a dual catalyst or bifunctional catalyst system.

After being contacted with the solution or colloidal suspension comprising catalytically active metal, the catalyst support can be dried, for example in air in a conventional drying oven. Alternatively drying may be carried out by microwaves. In other embodiments drying may be carried out by freeze-drying in an oxidising or neutral atmosphere. Any of these methods of drying may be carried out under vacuum.

After formation of the clusters of catalytically active metal, the resulting material can be calcined in a neutral or oxidising atmosphere, and may further comprise venting gaseous oxides. Before calcining or other post-treatment such as drying or reduction, the catalyst support can be washed in order to remove excess liquid from the external surface of the catalyst support. Thorough washing at this stage is advantageous, as the precipitated catalyst or catalytically active metals are entrapped within the internal porous structure of catalyst support framework, and hence will not be removed to any significant extent by the washing, allowing any impurities or unreacted material to be removed without significant detriment to the loading of precipitated catalytically active metal-containing clusters.

Previous methods for preparing encapsulated catalytically active metal-containing clusters tend not to be easy to carry out on a large scale. The present method provides an economic method for commercial bulk manufacturing of thermally stable supported encapsulated metal and metal-oxide catalyst particles.

The supported catalysts made according to the process of the present invention can find utility in catalysing chemical reactions.

For example, the catalysts can be used to catalyse steam reforming or water-gas-shift reactions. In steam reforming, water is contacted with a hydrocarbon or other organic material to produce syngas. The water gas shift reaction converts carbon monoxide to carbon dioxide and hydrogen in the presence of water. Metal oxide clusters such as spinel or perovskite structures can be used as catalysts for such reactions, without the need for pre-reduction of the catalysts to form metallic clusters.

The Fischer Tropsch (FT) process is another example of a reaction that can be calatysed by catalysts made according to the method of the present invention. The FT process can be used to convert syngas (a mixture of carbon monoxide, hydrogen and typically also carbon dioxide) into liquid hydrocarbons. Syngas can be produced through processes such as partial oxidation or steam reforming feedstocks, such as biomass, natural gas, coal or solid organic or carbon-containing waste or refuse. The products of the FT process can be tailored by altering reaction conditions and the catalyst components, for example to modify the paraffin/olefin ratio of the hydrocarbons, and to increase or decrease the extent of oxygenated products, such as alcohols, ketones and aldehydes, that may be produced. In FT reactions, the catalytically active metal-containing clusters will typically be chemically reduced before use, for example by treatment at high temperature with hydrogen gas.

Generally, there are two types of Fischer-Tropsch process, namely a high temperature process (HTFT) and low temperature processes (LTFT). Catalytically active metals often used in FT catalysts include those selected from the group consisting of nickel, cobalt, iron, ruthenium, osmium, platinum, iridium, rhenium, molybdenum, chromium, tungsten, vanadium, rhodium, manganese and combinations thereof. This group of metals is referred to herein as Group A. The catalytically active metal or at least one of the catalytically active metals is preferably selected from iron and cobalt.

FT catalysts can also comprise one or more alkali metal or alkaline earth metals, preferably from the group consisting of lithium, sodium, potassium, rubidium, caesium, magnesium, calcium, strontium and barium. Alkali metal and alkaline earth metal promoters can be used as the only type of promoter, or in combination with other promoters. A preferred promoter in this category is potassium.

Examples of other promoters that can be used in a Fischer Tropsch catalyst include metals selected from the group consisting of yttrium, lanthanum, cerium, any other lanthanide metal, and combinations thereof. This group of metals is referred to herein as Group B. Such promoters can be used as the only type of promoter, or in combination with other promoters. A preferred promoter from this group is selected from one or more of lanthanum and cerium.

Further examples of promoters that can be used include metals selected from the group comprising copper, zinc, gallium, zirconium, palladium and combinations thereof. This group of metals is referred to herein as Group C. Such promoters can be used as the only type of promoter, or in combination with other promoters. A preferred promoter in this group is copper.

Fischer Tropsch gas-phase processes are typically classified into high temperature (HTFT) and low temperature (LTFT) processes. HTFT processes are typically catalysed using an iron-containing catalyst, and operate at temperatures in the range of from 300 to 400° C., and pressures in the range of from 10 to 25 bara (1.0 to 2.5 MPa). LTFT processes are typically catalysed using iron or cobalt-containing catalysts, and can operate at temperatures in the range of from 150-240° C., and pressures of from 10-25 bara (1.0 to 2.5 MPa). LTFT gas-phase processes typically favour the formation of longer chain hydrocarbons. However, catalysts prepared according to the method of the present invention can be stable at higher temperatures, and hence the method provides flexibility in the range of processing conditions that can be tolerated by the resulting catalysts, which allows the temperature in the reaction zone of catalysed reactions to be tuned.

The one or more catalytically active metals can be the only metal in the clusters formed by the method of the present invention. Alternatively, the clusters can comprise one or more additional catalyst metals, co-catalysts and promoters. For a supported catalyst for a FT process, the catalytically active metal can be selected preferably from Group A or a combination thereof. Preferably, at least one of the catalyst metals is iron for an HTFT process, and at least one is cobalt for a LTFT process. Preferably, additionally present are one or more metals selected from alkali or alkaline earth metals, the metals of Group B and the metals of Group C. Preferably, at least one alkali-metal is present, which is preferably potassium.

In one embodiment, the method of the invention comprises:
providing a catalyst support comprising a zeolite framework, the zeolite framework containing charge-balancing cations of at least one group I or group II metal or combinations thereof;
providing a metal salt solution comprising:
  a first salt of a metal selected from Group A above and combinations thereof;
  a second salt of a metal selected from Group B above and combinations thereof; and
  a third salt of a metal C selected from Group C above and combinations thereof;
impregnating the zeolite framework with the metal salt solution by an incipient wetness impregnation method; and
calcining the impregnated zeolite framework support to form mixed metal oxide clusters in the zeolite framework support, the mixed metal oxide clusters having the formula $A_xB_yC_zO_n$, where x, y, and z are respectively relative proportions of the metals A, B, and C, in the oxide, where x+y+z is an integer, and where n is the relative proportion of oxygen which makes the oxide charge neutral.

In this embodiment, the cluster formed comprises a catalytically active metal from Group A, and other metals of Groups B and C, in addition to Group I or II metal, in an oxide form. The zeolite in this embodiment is preferably an aluminosilicate zeolite.

The so-formed clusters can be or can comprise hydroxides or oxides of the impregnated and charge-balancing metals. Therefore, the method can comprise reducing and/or carburising the clusters to activate the catalyst prior to the beginning of the reaction, by forming metallic or carbide species.

Under reaction conditions the clusters comprising catalytically active metal may exhibit multiple oxidation states, depending on the conditions and the amount of oxygen from the reactants and products in the reaction. For example, in FT reactions, the presence of carbon monoxide and carbon dioxide provides a source of oxygen in the reaction, which can end up in the products in the form of oxygenated compounds, such as alcohols, ketones, aldehydes and carboxylic acids. They can also provide a source of oxygen which can cause oxidation or partial oxidation of the catalyst components. Therefore, during a reaction such as a FT reaction, the clusters may be oxidised or partially oxidised, partially or fully reduced to the metallic state, and/or in a carbide or partial carbide phase.

The supported catalyst prepared according to the process of the present invention can be combined with other catalysts, for example to form bi- or multi-functional catalysts For example, optionally the supported catalyst produced by the method of the present invention can be combined with an acidic catalyst in a single reaction zone. By using the supported catalyst in combination with an acidic catalyst, the products formed on the supported catalyst are further upgraded into products of higher commercial value. For example, by adding an acid catalyst to a FT catalyst, the extent of olefin oligomerisation can be increased, which can increase yields of useful liquid hydrocarbons having hydrocarbon chain lengths in a range suitable for use as diesel fuels.

An advantage of the method of the present invention is that, by reducing migration of components of the catalyst, for example the catalytically active metals, promoters, co-catalysts and charge-balancing cations, then migration of such cations out of the internal pore structure of the catalyst support is inhibited, which prevents them contacting other components, for example additional acid catalyst, which reduces or eliminates deactivation through neutralisation or other processes. Thus, even where supported catalysts are used, for example those comprising zeolites with high amounts of alkaline or alkaline-earth cations, deactivation of an acidic catalyst component of a bi-functional catalyst by migration of these cations is reduced or even eliminated.

In one embodiment, such a bifunctional catalyst is for use in carbon oxide hydrogenation processes, and comprises a supported FT catalyst prepared according to the method described above, and an acidic catalyst. The acidic catalyst may be a solid selected from the group consisting of acidic zeolite, silica-alumina, sulphided oxide, acidic resins, solid phosphoric acid, acidic clays, or a combination thereof. An example of such an acidic catalyst is H-ZSM-5 zeolite.

The acidic component can have activity towards reactions such as hydrocarbon cracking, oligomerisation, cyclization and isomerisation, and oxygenate dehydration.

The supported catalyst can be or can comprise a zeolite framework as the catalyst support, which in turn can comprise at least one charge balancing cation of a group I or group II metal, for example potassium, as described above, and clusters comprising a catalytically active metal, such as iron.

In such an embodiment, one functional component of a bifunctional catalyst (the FT synthesis component) can be promoted by a basic cation, while at the same time avoiding any negative effects of such a basic cation on a separate functional component of the bifunctional catalyst (the acidic component)

Thus a catalyst prepared according to the method of the present invention can be used in a bifunctional catalyst, for example one which is effective in hydrocarbon production reactions (e.g. F-T processes) which utilise the supported catalyst comprising the catalytically active metal-containing clusters, in combination with an acidic catalyst, for example, which can isomerise hydrocarbons, to produce high octane number hydrocarbons in the gasoline boiling range.

A bifunctional catalyst can comprise different catalytic components bound together in a single body, for example a particle, pellet, extrudate or granule. Alternatively, the bifunctional catalyst can comprise separate, unbound bodies of the different catalytic components that are physically mixed together, for example essentially randomly distributed or separated in layers within a catalyst bed.

The supported catalysts formed by the process of the present invention can be used in carbon monoxide/carbon dioxide hydrogenation reactions.

For example, a gas feedstock comprising hydrogen and at least one of carbon monoxide and carbon dioxide can be fed to a reaction chamber containing the supported catalyst, such that, in the presence of the supported catalyst (optionally after having been chemically reduced prior to reaction), the carbon monoxide and/or carbon dioxide are hydrogenated to produce hydrocarbon products, which can be removed from the reactor.

The hydrocarbon products may comprise saturated, unsaturated, oxygenated, non-oxygenated, aromatic, linear, branched or cyclic hydrocarbons. In one embodiment the preferred hydrocarbon products are oxygenated hydrocarbons, of which alcohols are most desirable. In another embodiment branched and/or linear non-oxygenated hydrocarbons in the C4-C9 range, such as the C6-C9 range, are the preferred hydrocarbon products. In yet another embodiment linear non-oxygenated hydrocarbons in the C10-C23 range, such as the C16-C20 range, are the preferred hydrocarbon products. Selectivity to the desired products can be controlled by a number of means, for example by controlling the reaction temperature and pressure, the relative concentrations or partial pressures of the reactants and the catalyst components, and by adding or recycling various components to the reactor. Carbon monoxide and carbon dioxide hydrogenation processes are well known in the art. In one embodiment, a second set of hydrocarbon products can be produced by reacting all or a portion of the products of the reactor with a different catalyst, or with a component of a bifunctional catalyst, for example through a reforming reaction to produce high or higher octane gasoline components. The second set of hydrocarbon products may be $C_4+$ hydrocarbons, saturated or unsaturated in the gasoline, kerosene, diesel or lube boiling range or combinations thereof.

Reforming the first set of hydrocarbon products, or a portion thereof, may comprise any process which changes hydrocarbon products with low octane ratings into products with higher octane ratings, including but not limited to oligomerisation, isomerisation, aromatisation, hydro-cracking, alkylation reactions or combinations thereof.

BRIEF DESCRIPTION OF THE DRAWINGS

There will now be described, by way of example only, various embodiments of the invention with reference to the drawings, of which.

DETAILED DESCRIPTION OF EMBODIMENTS OF THE INVENTION

The present invention can be illustrated by the production of a catalyst for use in hydrocarbon production or preparation, and in will be described with reference to non-limiting examples in applications relating to the hydrogenation reactions of carbon monoxide and carbon dioxide to form useful hydrocarbons. The invention has broader application and the principles of the invention will be demonstrated by reference to related theory and the application of the theory by the inventors.

Figure 1A:
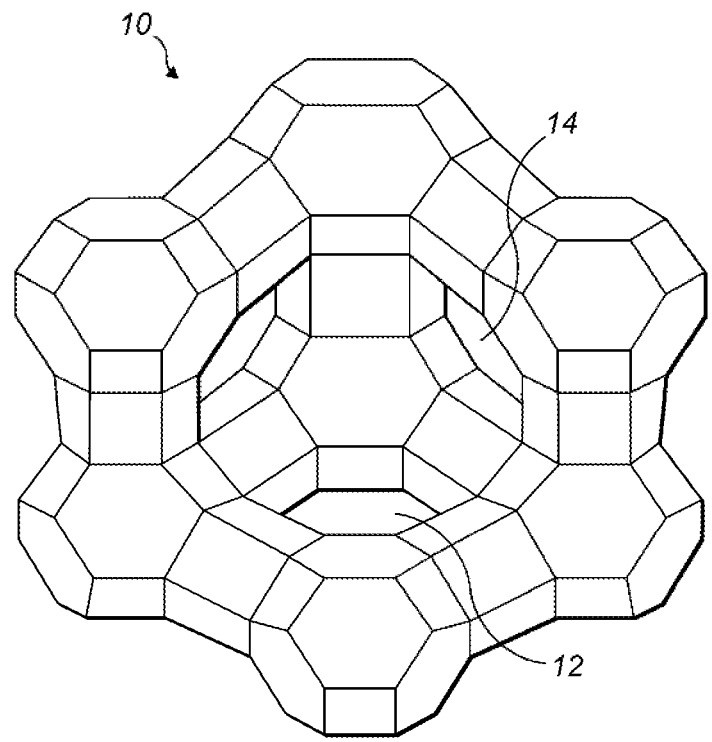
FIG. 1A is a schematic representation of the structure of zeolite Y.

Zeolitic support frameworks can be used as the catalyst support for active metal cluster catalysts. FIG. 1A shows a schematic representation of a basic framework unit of zeolite Y, generally depicted 10. Zeolite Y adopts the faujasite (FAU) zeolitic structure according to the International Zeolite Association Structure commission nomenclature. Zeolite X is another example of a faujasite zeolitic structure, differing from zeolite Y in its chemical composition, in particular its lower silicon to aluminium molar ratio.

Zeolites with faujasite structure are suitable supports for the catalyst compositions described herein, because they have void spaces or cages 12 in the crystalline structure of a zeolitic material with dimensions in the order of few angstroms to one or two nanometers. These void spaces or cages are accessed through apertures or windows 14 which typically have maximum dimensions less than the maximum dimensions of the void space they surround. Void spaces may be referred to as nanocages or supercages, depending on their position in the lattice and their dimensions. In the case of the faujasite zeolitic structure corresponding to zeolite Y represented in FIG. 1A, the void space of the supercage has a maximum dimension of 1.3 nanometers. The apertures giving access to the void space of the supercage have a maximum dimension of 0.74 nanometers and are formed by twelve-membered rings. The void space of the supercage in a faujasite zeolitic structure is also surrounded by ten sodalite cages of smaller dimension, which are connected through hexagonal prisms.

A zeolite with faujasite structure is suitable for producing catalyst compositions according to the method of the present invention because clusters with maximum dimensions larger than the dimensions of the zeolite apertures can be formed in the void spaces. In this way, the aggregation or sintering of the catalytically active metal-containing clusters is mitigated because the clusters are encapsulated in the support supercages therefore preventing contact between neighbouring clusters.

Figure 1B:
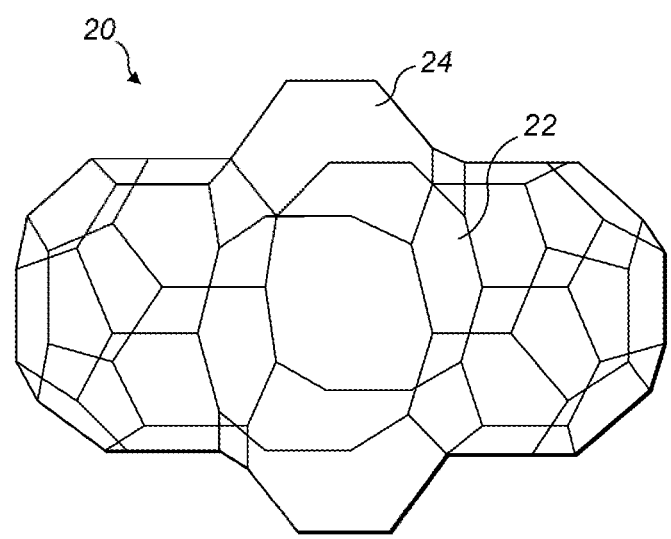
FIG. 1B is a schematic representation of the structure of zeolite MCM-22.

FIG. 1B shows a structural unit of a MCM-22 zeolite (Mobil Composition of Matter No 22), generally depicted at 20, which adopts the MWW framework structure according to the International Zeolite Association Structural Commission. Zeolite MCM-22 has supercages 22 as defined by its crystalline structure and which have a void space with a maximum dimension of 1.82 nanometers and a minimum width of 0.71 nanometers. The void space of zeolite MCM-22 supercage is accessed through apertures 24 which maximum dimensions are less than the dimensions of the supercage void space. As with the faujasite zeolites, it is possible to form metal oxide clusters in the void spaces of the MCM-22 zeolite to mitigate or prevent the aggregation or sintering of the metal oxide clusters.

Figure 2:
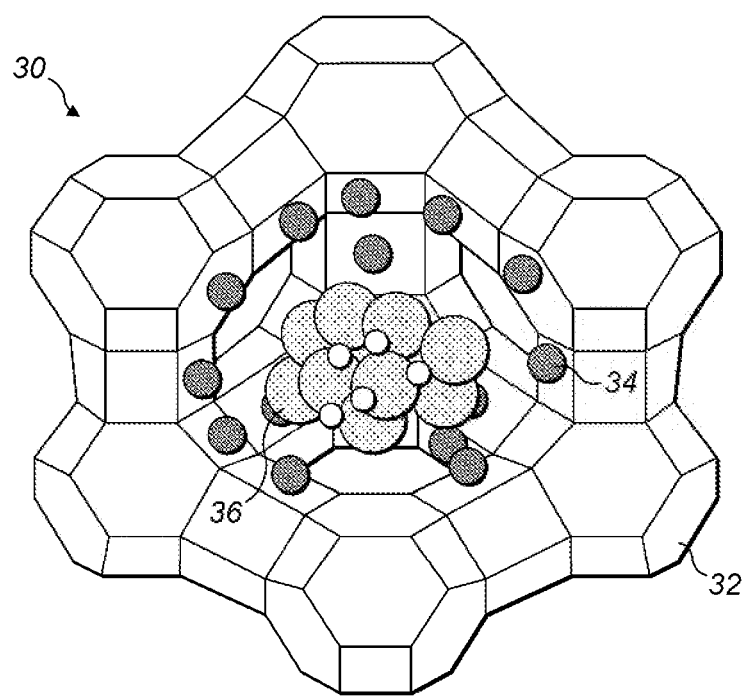
FIG. 2 is a schematic representation of a catalyst according to an embodiment of the invention.

FIG. 2 shows schematically a structural unit of a catalyst according to an embodiment of the invention, generally depicted at 30. The catalyst unit represented in FIG. 2 is supported on a zeolite Y framework 32, which has been subjected to ion-exchange with group I or group II cations 34, which in this case are potassium cations. The potassium cations are extra-framework cations and are attached to the exchange (negatively charged) positions of the zeolite Y lattice. The potassium cations are loaded onto and bound to the framework surrounding the void spaces of the zeolite Y cages. Potassium ions and other group I and II ions are known to have a promoting effect on catalytic function in hydrocarbon production processes such as Fischer-Tropsch processes, in particular potassium lowers the methane selectivity, increases the chain growth probability and the olefinic character of the products in a Fischer-Tropsch process. The inventor has recognised that it is desirable for the promoting cations to be loaded on the framework to provide an excess over the ion-exchange capacity, and therefore are fully exchanged on the ion exchange sites. The excess potassium not functioning as a charge-balancing cation is present in the form of a separate salt or compound within the internal pore structure. In this embodiment, the total loading of potassium in the zeolite Y is greater than 14% by weight, and is preferably greater than 15 wt %, and even more preferably greater than 20 wt %. If the precipitant used is potassium carbonate or potassium bicarbonate, then the loading of such potassium carbonate or bicarbonate on the potassium-exchanged zeolite is preferably 5 wt % or more, more preferably 10 wt % or more, based on dry weight of the ion-exchanged zeolite catalyst support.

In the void spaces of zeolite Y cages, active metal oxide clusters 36 (i.e. active in the catalytic reactions for which the catalyst is intended) are formed by impregnating a metal salt solution into the void space. The metal salt precipitates in the void space and, after calcining, forms a metal oxide. The metal oxide is formed so as to have a kinetic diameter which is larger than the maximum dimension of the apertures which access to the zeolite Y cages. This reduces the likelihood of movement of the cluster and therefore reduces aggregation or sintering of neighbouring clusters.

Particular combinations of metals can form a mixed metal oxide cluster which are cation deficient. In one embodiment, such mixed metal oxide clusters have a perovskite or spinel structure. Without being bound by theory, it is believed that by forming such a metal oxide cluster which is cation vacant or deficient, can improve stability against migration and sintering. A cation vacant metal oxide cluster is one that has cation vacancies in the structure or lattice. A cation deficient cluster can combine with or accept charge-balancing cations, such as potassium promoter ions, (that are associated with the zeolite framework.

Without wishing to be bound by theory, the inventors believe that this combination gives rise to an electrostatic interaction between the extra-framework cations (in this case potassium promoter charge-balancing cations) and the cation-vacant metal oxide cluster. This interaction can help further to reduce migration of promoter cations. In catalysts prepared by previously known methods, the migration of group I and group II promoter atoms is a common cause of alkali-promoted catalyst deactivation. By restricting or preventing migration, the deactivation is reduced and stability of the catalyst is increased. In addition, the proportion of the promoter cations which can be included in the catalyst can be increased. In the past it has been recognised that there is an upper limit to the amount of promoter cation which can be incorporated into an active metal catalyst, due to the observed effects on catalyst stability and deactivation when the promoter cation migrates. In contrast, it is hypothesised that in the preparation method of the present invention the combination of high loading of cation promoter and a cation vacant cluster can result in a stable framework structure and restricted migration of the cations.

Preferred support structures are those zeolites with intermediate or relatively low silica content, as these will tend to have a greater number of framework negatively charged sites where cation promoters can be incorporated, and can therefore permit a greater degree of loading of the cation promoters.

A mixed metal oxide cluster can have the formula $A_xB_yC_zO_n$, where x, y, and z are respectively relative proportions of metals A, B, and C, in the oxide. The sum of x, y, z is an integer, and n is the relative proportion of oxygen which makes the oxide charge neutral.

Metal A is a catalytically active metal, selected from the group consisting of nickel, cobalt, iron, ruthenium, osmium, platinum, iridium, rhenium, molybdenum, chromium, tungsten, vanadium, rhodium, manganese and combinations thereof. Iron is used in many applications, including in Fischer-Tropsch processes, and in a preferred embodiment the metal A is iron or cobalt.

Metal B is selected from the group consisting of yttrium, lanthanum, cerium, or any lanthanide metal, and combinations thereof. The presence of a metal B is believed (again without being limited by theory) to lend the cluster a cation vacant character, which can improve stability not only of the cluster but also the framework. In addition, the metal B can also lend improved hydrogen absorption characteristics to the supported catalyst.

Metal C is selected from the group consisting of copper, zinc, gallium, zirconium, palladium and combinations thereof. Without being limited by theory, the presence of metal C, in particular Cu, is believed to have a positive promoting effect on metal A in addition to lowering the reduction temperature of the mixed metal oxide clusters to form metallic clusters. In a preferred embodiment the metal C is copper.

Figure 3:
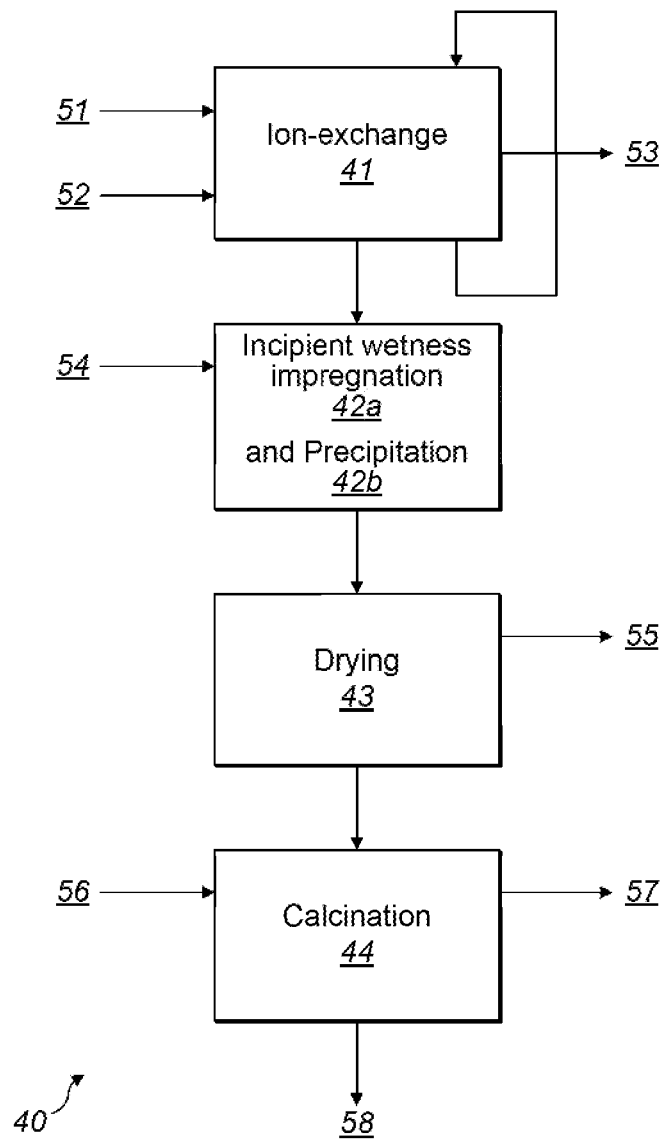
FIG. 3 is a block diagram showing schematically a general method of preparation of a catalyst according to an embodiment of the invention.

FIG. 3 is a schematic block diagram representing a general method of preparation of a catalyst according to embodiments of the invention, generally depicted at 40. The following steps are undertaken to prepare a catalyst according to the present invention.

For an aluminosilicate zeolite catalyst support, the support material is typically provided or prepared with sodium charge-balancing cations; i.e. the cations balancing the negative charge of the support framework are sodium ($Na^+$). The positions of the charge balancing cations in the zeolite frameworks are well defined, and the number of exchangeable cations depends on the silica to alumina ratio of the support material. It is advantageous but not essential for support materials with low silica to alumina ratios to be used, as they offer a greater capacity for exchange cations. In the preferred embodiments, zeolite Y or zeolite X are the support materials used.

If it is desired to replace the charge-balancing sodium ions with a different cation, an ion-exchange 41 of the zeotypic support material 51 can be performed. This is the process in which the cations present in a zeotypic material are exchanged with other cations. This process can be performed by several methods known in the art. The most common is ion-exchange in solution, wherein a diluted solution 52 of one or more salts including the cation or cations to be exchanged is stirred and the support material is added to this solution. During the ion-exchange, the cations in solution progressively replace the cations ionically bonded to the support framework, and the resulting solution 53 from the ion exchange process is discarded.

The solution can be heated to increase the rate at which the exchange takes place. To achieve the levels of ion exchange desirable in the present invention, it may be necessary to perform more than one ion-exchange process because the complete exchange may not be achieved in a single step.

The ion exchange capacity of a particular zeotypic material may be calculated if the silica to alumina ratio is known, and it is possible to determine the content of a metal in a zeotypic material and compare the content of a metal in a zeotypic material with the calculated exchange capacity. This indicates whether a complete exchange has been achieved, or if more or less metal than the maximum exchange capacity has been retained in the zeotypic material.

In the example embodiments of the invention the ion-exchange was performed using zeolite Na—Y as the support material and potassium carbonate or bicarbonate as the source of charge-balancing cations, and also the precipitant. After every ion-exchange step, washing of the resulting material with water was carried out. The final ion-exchange step can result in the material containing excess potassium carbonate or bicarbonate in the pore structure of the zeolite which functions as the precipitant. In this case, a final washing step can be carried out which aims to partially remove potassium carbonate or bicarbonate salt solution that remains on the external surface of the material but not the excess salt solution from inside the pores of the support. Alternatively, after the final ion-exchange step, the ion-exchanged zeolite material can be thoroughly washed after completion of the ion-exchange, and subsequently dried, before the resulting material is subsequently treated with excess potassium carbonate or bicarbonate solution, for example through an incipient wetness impregnation using a potassium carbonate or bicarbonate solution, to load the pores of the zeolite with the potassium carbonate or bicarbonate precipitant. At this point, a mild wash/rinse to remove excess potassium carbonate or bicarbonate from the external surface can be carried out to avoid precipitation of catalytically active metal clusters on the external surface. Alternatively, such a wash can be avoided, which can help to protect the external surface of the catalyst support from damage by an acidic catalytically active metal-containing solution. Using a final incipient wetness impregnation of precipitant is advantageous, because by using a known concentration of precipitant solution, and with a knowledge of the pore volume of the catalyst support, a known amount of precipitant can be loaded into the internal pores of the support, which can help control the final loading of catalytically active metal-containing clusters.

After the washing step, the resulting material is dried to remove excess moisture. Drying can be performed by any of the conventional drying methods known in the art, for example, the material can be dried in a furnace at 100 to 120° C. overnight.

After the material has been dried, a solution or colloidal suspension comprising the catalytically active metal can be performed, using for example an incipient wetness impregnation method. The incipient wetness impregnation technique involves producing a solution or colloidal suspension comprising the catalytically active metal, for example in the form of one or more dissolved salts, that are to be incorporated in the catalyst support material. The volume of liquid (solution or colloidal suspension) to be mixed with the support is close to or slightly higher than the pore volume of the support used, so that substantially all of the liquid enters in the pores of the support. The amount of salt used to produce the solution or colloidal suspension will determine the final metal loading of the catalyst. Typically, the catalytically active metal (and any other metals such as promoters or co-catalysts) are impregnated into the the support using an aqueous solution. Example embodiments of the invention use double de-ionised water as a solvent for salts, such as iron, cerium and copper salts, in the incipient wetness impregnation method. However, the invention extends to the use of other metal salts and solvents.

During the incipient wetness impregnation 42a, the solution comprising the catalytically active metal 54, can be an acidic solution, for example it can comprise a nitrate salt which is acidic. The solution penetrates into the pores of the support, where a precipitant such as group I or group II metal carbonate or bicarbonate salts are present. At this point, the pH of the solution increases, due to the presence of the basic precipitant, to a point where the calatytically active metal precipitates, 42b, for example in the form of an oxide or hydroxide. This pH increase causes the effective and uniform precipitation of the catalytically active metal-containing precursor salts inside the support pores and cages to form catalytically active metal-containing clusters. The method is therefore a deposition-precipitation method by incipient wetness impregnation. The resulting material can be washed at this stage to remove excess nitrate and potassium ions from the framework and the external surface.

Prior to impregnation, the pH of the catalytically active metal-containing solution can be adjusted to make it more basic, to a point just below the pH of the point of precipitation in order to maximise the extent of precipitation within the internal pores, and also to the lessen the negative effects of acidity, which can attack a zeolite's framework structure. Controlling the pH can also assist in improving the extent of precipitation by the precipitant.

After the impregnation step, the material is dried 43. The slurry can be left to dry in a furnace or it can be dried by other conventional methods. Water 55 is removed from the material.

When the material has been dried, the material is calcined 44. This calcination step is a thermal treatment in air 56 which removes the anions of the salt used in the impregnation treatment produces the metal oxides which act as catalytic active species. For example, nitrate salts decompose in order to form metal oxides and volatile nitrogen compounds 57. The metal oxides formed during calcining are predominantly located in the cages of the zeolite material, whereas the nitrogen compounds, if not washed out of the material during washing, leave the support as a gas. In previous methods, where catalytically active metal has been added to a catalyst support (e.g. zeolite) as a charge-balancing cation, the calcination procedure can partially affect the crystalline zeotypic framework by transforming it partially into amorphous material. Excessive aggregation of the oxide clusters can also produce structural damage to the zeotypic framework of the material. However, in the present embodiment it is believed that due to the precipitant, a stabilising effect is produced so that the metal oxides do not aggregate during calcination (or during its subsequent use). In this way, damage to the zeotypic framework can be limited, and the active metal oxide clusters are preserved, and a stabilised supported mixed oxide cluster catalyst precursor 58 is produced.

The catalyst can be used in fixed bed reactors, fluidised bed reactors or slurry reactors. In order to be used in fixed bed reactors it is beneficial to combine the catalyst with a binder or binders and form particles or pellets of suitable size in order to avoid excessive pressure drops across the reactor, to improve structural integrity and attrition resistance of the catalyst. Suitable binders include kaolin clay, titanium dioxide, calcium oxide, barium oxide, silica, alumina, mixtures of them and other binders known in the art. The catalysts prepared according to the present invention tend to have high attrition resistance, even without binder, which is advantageous in fixed bed, fluidised bed and slurry processes.

The catalyst can be used in hydrocarbon producing processes such as the Fischer-Tropsch process, in carbon dioxide capture processes in order to reduce carbon dioxide emissions and produce valuable hydrocarbons and other hydrocarbon conversion processes, such as ethylbenzene dehydrogenation or hydroisomerisation of hydrocarbons. Catalysts made according to the present invention can also be used in conversions that do not involve hydrocarbon synthesis or conversion, for example ammonia manufacture from nitrogen and hydrogen, or methanol synthesis from syngas.

Figure 4:
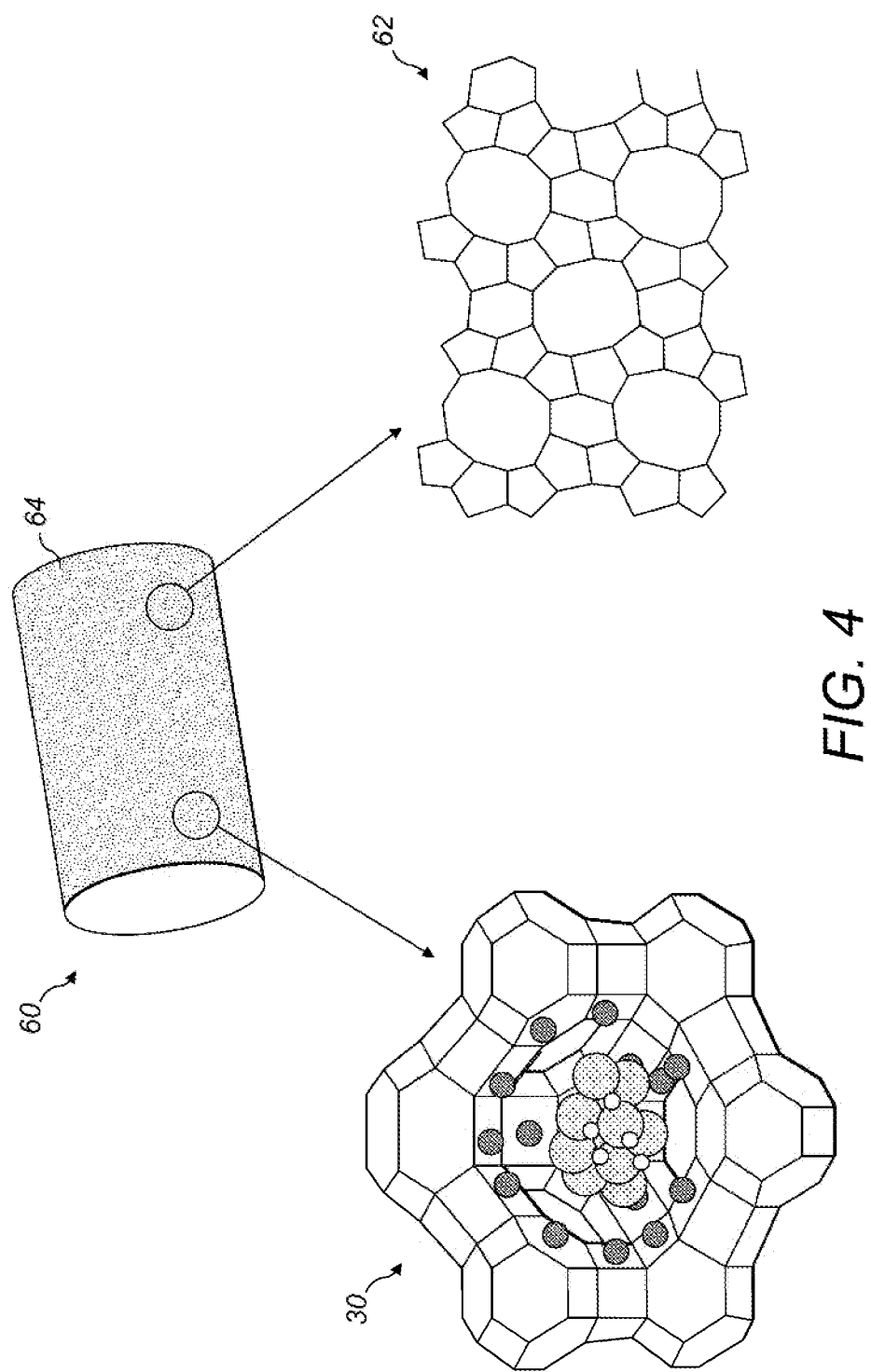
FIG. 4 is a schematic representation of a bifunctional catalyst pellet according to an embodiment of the invention.

The principles of the invention lend themselves to produce bifunctional catalysts based on one or more embodiments of the invention. FIG. 4 shows a bifunctional catalyst, generally depicted at 60, prepared by combining a primary metal oxide catalyst 30 according to an embodiment of the invention with a solid acid catalyst 62 (which is H-ZSM-5 zeolite in this embodiment). The bifunctional catalyst 60 is combined with a peptizable alumina binder to form a pellet 64. Other solid acid catalysts can be used for producing bifunctional catalysts.

The bifunctional catalyst of this embodiment may be used for example in a hydrocarbon production process which uses a carbon dioxide rich feedstock. The function of the solid acid catalyst is to reform the primary products produced on the primary metal oxide cluster catalyst, into products with higher octane rating by reactions typically produced on the solid acid catalysts. Such reactions include isomerisation, aromatisation, oligomerisation and hydrocracking reactions. The bifunctional catalyst yields an upgraded gasoline range product from a hydrocarbon producing process with enhanced commercial value.

A characteristic feature of the bifunctional catalyst of FIG. 4 is that deactivation by poisoning of the solid acid catalyst due to migration of group I or group II cations from the primary catalyst is significantly reduced compared to other catalysts known in the art. This is notwithstanding the elevated content of group I or group II cations linked to the framework of the primary catalyst. This reduced poisoning is attributable to the characteristics of the primary catalyst of the invention. The catalyst of FIG. 4 is therefore a bifunctional catalyst with a high content in group I and group II promoting cations, which exhibits a reduced level of poisoning due to migration of group I or group II cations into the H-ZSM-5 acid catalyst, thus enabling its reforming function to be maintained for longer times on stream.

Figure 5:
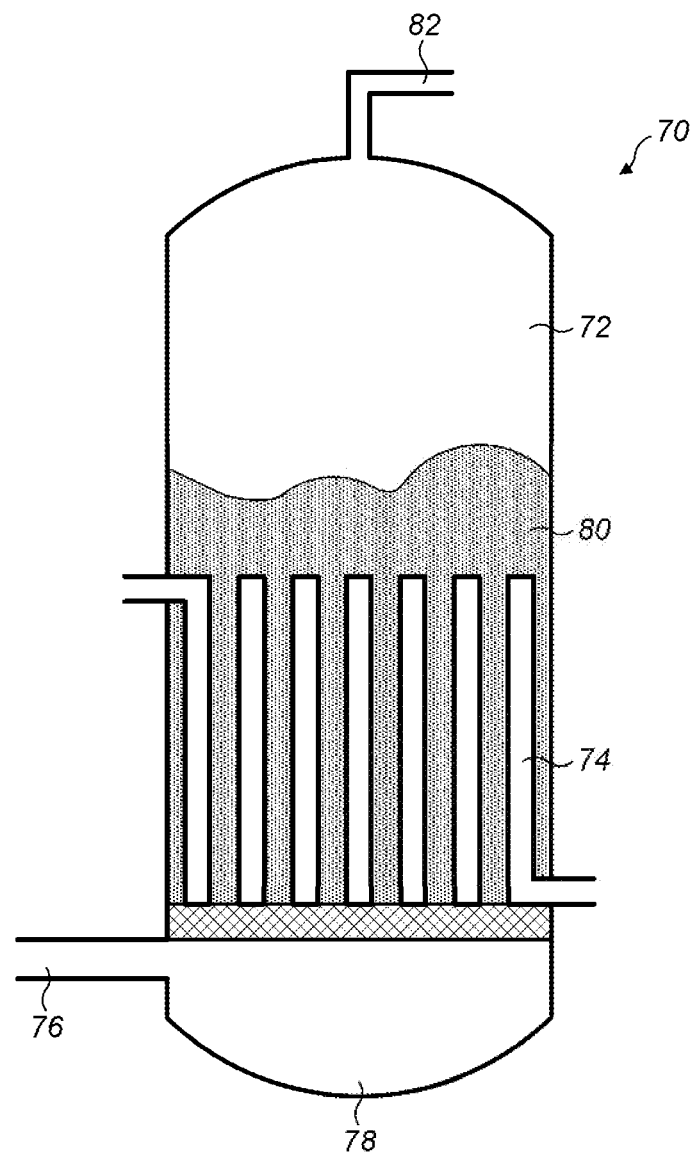
FIG. 5 is a schematic representation of a reaction scheme in which catalysts according to embodiments of the invention may be used.

FIG. 5 represents a basic hydrocarbon producing process 70 which is carried out in a fluidised bed reactor 72, which is a typical application for the catalysts of the invention. The reactor comprises refrigeration and heating elements 74. The cooling is accomplished by water circulation though the interior of the reactor and the heating is carried out by water vapour circulation through a heating coil disposed in the interior of the reactor.

The reactor feed stream is a synthesis gas stream and is introduced by an inlet 76 at the bottom of the reaction vessel 78. The pressure at the bottom of the reactor is sufficient to overcome the pressure drop of the reaction medium support and to fluidise the catalyst bed.

The synthesis gas is transformed into hydrocarbon products as it flows through the fluidised bed 80. The hydrocarbon products are extracted through an outlet 82 at the top of the reaction vessel. The fluidised bed contains a catalyst according to an embodiment of the present invention plus other materials that aid in keeping the catalyst bed in a fluidised state and in keeping a uniform temperature across all the catalyst bed.

EXAMPLES

Figure 6:
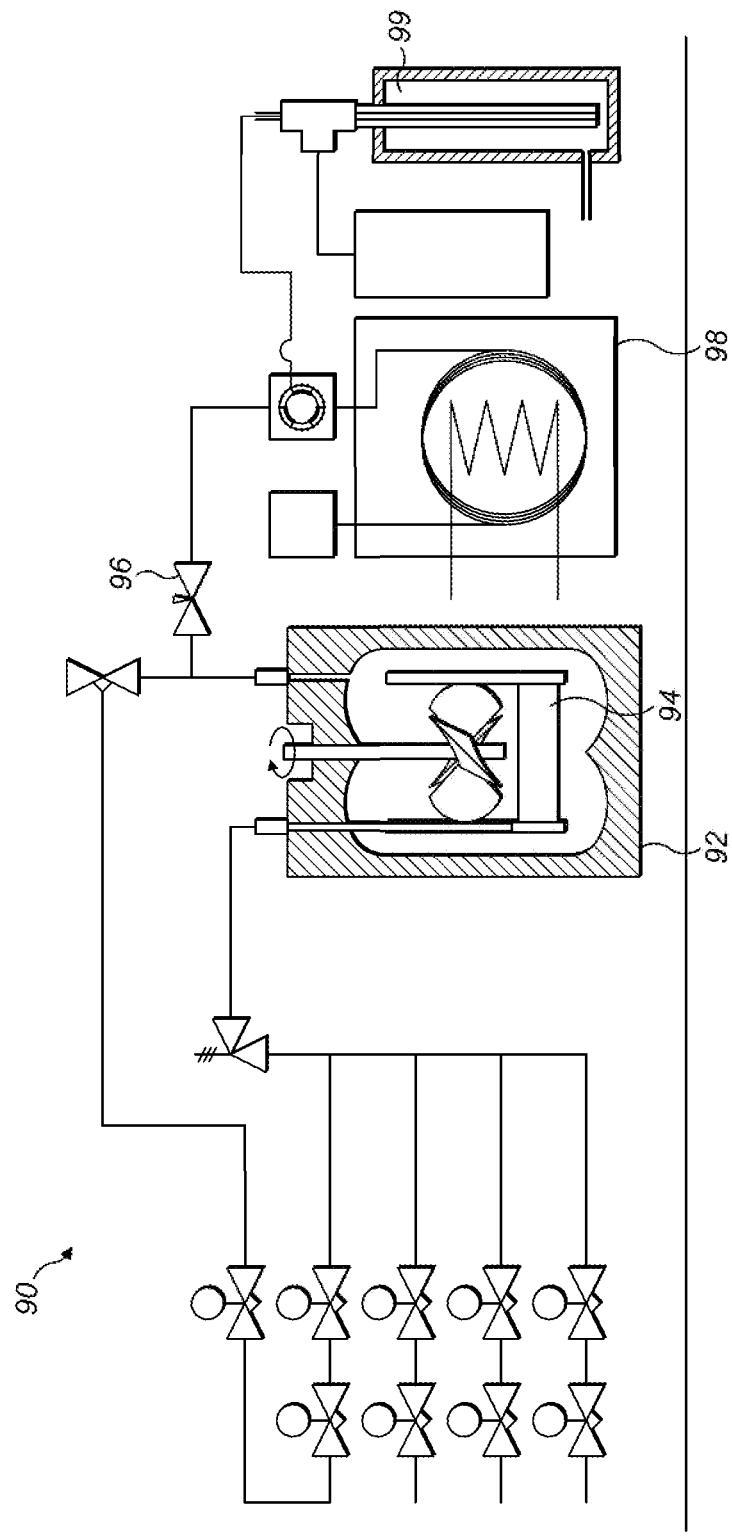
FIG. 6 is a schematic representation of an experimental set-up used in testing the catalysts of the invention.

There now follows a detailed description of example embodiments of the invention. The examples were tested in an experimental set-up shown schematically in FIG. 6. The experimental set-up 90 includes a reactor 92 with a volume of 840 ml determined gravimetrically from water filling.

During the experiments, the feed flow rate was ordinarily kept constant at 1000 standard cubic centimeters per minute (sccm), which was sometimes changed to 200 sccm or 100 sccm during the tests. With 5 g of catalyst and a feed flow rate of 1000 sccm, the modified residence time becomes 0.3 gram seconds per standard cubic centimeters (g·s/sccm). gas hourly space velocity is 7800 per hour ($h^{-1}$).

The catalyst basket 94 (7 cm diameter) comprises two circular 3 mm aperture grids each holding a 15 micron sintered stainless steel felt (of 15 micron aperture) in place. The catalyst (5 g), placed between the upper and lower sieve/felt closures, has a mean particle diameter of 35 micron after sieving so as to remove the fraction smaller than 25 micron. The catalyst fills the apertures of the sieve, uniformly covering the basket floor area to a depth of 2 mm.

Prior to the initiation of the reaction the catalysts were reduced in situ in hydrogen at 723 K for 18 h. A small part of the reactor effluent passes through a needle valve 96 to the sampling valve GC-FID 98 (equipped with a CP-Sil 5B non-polar capillary column) from where it returns to a knock-out stage 99 to condense the water and C5+ hydrocarbons before the micro-GC-TCD takes a sample to analyze the permanent gases: Ar, CO, $CH_4$, $CO_2$ on a CO), column with $H_2$ carrier gas and a molecular sieve column for the $H_2$, $CH_4$, CO separation with Ar carrier gas.

Example 1—Catalyst A

The following steps were undertaken to prepare Catalyst A (Fe/Ce/Cu/KY).

The Y-zeolite was prepared in the $Na^+$ cation exchanged form. However, an ion exchange with $K^+$ was carried out because $K^+$ is a better promoter than $Na^+$ for an Fe-based HTFT catalyst.

The ion exchange of NaY was carried out by adding 12 g of NaY to a 600 ml of a 0.5M $K_2CO_3$ solution in doubly deionized water. The amount of $K_2CO_3$ in the solution represents a 6-fold excess of $K^+$ with respect to the amount of cation-exchanging sites of the zeolite. The resulting suspension was stirred and heated at 80° C. with reflux cooling for a minimum of 4 hours. Subsequently the resulting ion-exchanged zeolite was filtered and washed with doubly deionized water.

This procedure was repeated three times in order to obtain complete ion-exchange, and provide excess cations over the ion-exchange capacity of the framework, and was dried before use.

The resulting KY zeolite was impregnated with a suitable amount of solution of $Fe(NO_3)_2$, $Ce(NO_3)_3$ and $Cu(NO_3)_2$.

The volume of solution used was equal to the pore volume of the zeolite added. These nitrate salts are highly soluble and allow the impregnation of metals to be done simultaneously.

The resulting slurry was dried at 120° C. and calcined in air at 550° C. for 18 h.

The overall composition of the impregnated transition metal ions in the catalyst then reflects the following atomic ratios; Fe:Ce:Cu=86:9.5:4.5. A zeolite-Y with a Si/Al ratio of 2.9 contains a theoretical 14.4 wt. % K when fully exchanged.

5 g of the resulting catalyst was loaded into the reactor. Prior to the reaction the catalyst was reduced in situ in hydrogen at 723 K for 18 h.

The reactor feed stream consists of 159 ml/min of CO, 100 ml/min of Ar, 635 ml/min of $H_2$ and 106 ml/min of $CO_2$ which were mixed before entering the reactor. The ratio $H_2/(2CO+3CO_2)$ is equal to one. The reaction temperature is 603 K and the Gas Hourly Space velocity (GHSV) is 7800 $h^{-1}$. The pressure in the reactor was 20 bar.

Figure 7:
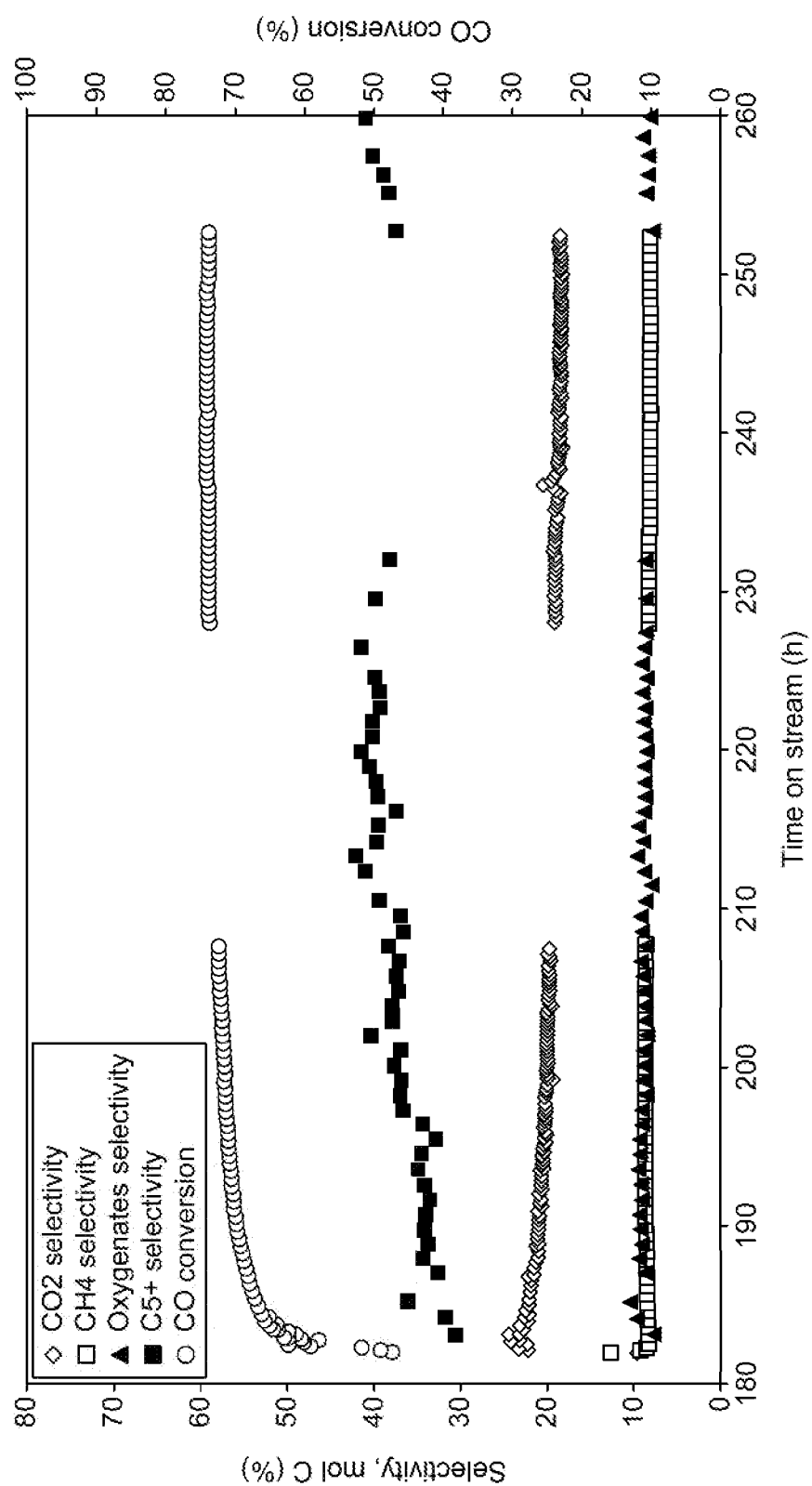
FIG. 7 is a graph showing the conversion and selectivity of a catalyst according to an embodiment of the invention tested in a CO hydrogenation application.

$CO_2$ hydrogenation is a two step process, firstly the catalyst shows high activity for the Reverse Water Gas Shift reaction, converting $CO_2$ to CO followed by conversion of CO to hydrocarbons, The results of the test are represented graphically in FIG. 7 and summarised in Table A.

It can be seen that the steady state CO conversion is 74% and there is no catalyst deactivation as it can be observed in FIG. 7. It can also be observed that in the transient period there is a downward trend in the water-gas shift reaction activity, as evidenced by the decreasing carbon dioxide selectivity, and an increasing trend in the selectivity to C5+ hydrocarbons and in the carbon monoxide conversion. The methane selectivity exhibits a very stable profile.

Very significant is the high value for the chain growth probability obtained in this example, which is not observed in conventional HTFT catalysts. Typical values of chain growth probability (which maximum theoretical value is 1) of commercial High Temperature Fischer-Tropsch Fe based catalyst are around 0.70 under the reaction conditions of this test. However the catalyst of this example has a chain growth probability of 0.81 in the tests carried out and described in this example, and exhibit high carbon monoxide conversions (74%), low methane selectivity (8.4%) and high condensate fraction (59.2%) at steady state.

The observed good performance is stable over time and no deactivation effects were noted during the tests. This performance stability makes this invention very suitable for the commercial realisation of a hydrocarbon forming process using the catalysts made according to the method described in the present invention

TABLE A

|  | Cat A |
|---|---|
| GHSV ($h^{-1}$) | 7800 |
| $H_2/(3CO_2 + 2CO)$ | 1 |
| Temperature (K) | 603 |
| Pressure Bar. | 20 |
| CO conversion | 74 |
| Selectivity (mol C (%)) | |
| CO2 | 18.5 |
| C1 | 8.4 |
| C2-C4 | 24.9 |

TABLE A-continued

| | Cat A |
|---|---|
| C5+ | 39.7 |
| Oxygenates | 8.7 |
| Condensate fraction (%) (C5++ oxyg.)/HC | 59.2 |
| Chain growth probability | 0.81 |
| Olefinicity ol./(ol. + para.) | 83.9 |

Catalyst A was also tested for carbon dioxide hydrogenation. The results of the test of catalyst A in carbon dioxide hydrogenation are summarised in Table B.

The reactor feed stream consists of 100 ml/min of Ar, 675 ml/min of $H_2$ and 225 ml/min of $CO_2$ which are mixed before entering the reactor. The ratio $H_2/(2CO+3CO_2)$ is equal to one. The reaction temperature is 603 K and the Gas Hourly Space velocity (GHSV) is 7800 $h^{-1}$. The pressure in the reactor is 20 bar.

The obtained condensate fraction is 45.6% of the products. The chain growth probability is about 0.7. The methane selectivity is 9.3 and the selectivity to C5+ hydrocarbons is 21.8.

For comparison purposes, another catalyst, catalyst B, has been prepared following the same procedure of preparation of catalyst A except that no copper salt has been added in the incipient wetness impregnation step. The test results of catalyst B in carbon dioxide hydrogenation are summarised in Table B.

The $CO_2$ conversion and CO selectivity is similar for both catalysts A and B. Catalyst A produces slightly more oxygenates and the methane selectivity is lower than with catalyst B. The chain growth probability is higher with catalyst A, as well as the C5+ selectivity. The condensate fraction obtained with catalyst A is 45.6 whereas that obtained with catalyst B is 33.7.

This comparison exemplifies that the addition of a metal selected from the group C, copper in this case, to form a supported mixed oxide cluster catalyst has additional benefits over supported mixed oxide cluster catalyst that do not contain any metal of group C.

TABLE B

| | Cat A | Cat B |
|---|---|---|
| GHSV ($h^{-1}$) | 7880 | 7880 |
| $H_2/(3CO_2 + 2CO)$ | 1 | 1 |
| Temperature (K) | 603 | 603 |
| Pressure Bar. | 20 | 20 |
| CO2 conversion | 22.1 | 22.2 |
| Selectivity (mol C (%)) | | |
| C1 | 9.3 | 12.5 |
| C2-C4 | 25.7 | 29.3 |
| C5+ | 21.8 | 16.8 |
| Oxygenates | 7.6 | 4.5 |
| Condensate fraction (%) (C5++ oxyg.)/HC | 45.6 | 33.7 |
| Chain growth probability | 0.71 | 0.65 |
| Olefinicity ol./(ol. + para.) | 79.8 | 77.4 |

Example 2—Catalyst E

As has been described above, the catalysts of the present invention are also suitable components for preparing bifunctional catalysts. In this example, catalyst E was prepared by a combining 5 g of catalyst A with 5 g of ZSM-5 zeolite extrudates (80% H-ZSM-5 zeolite, 20% alumina binder) which were placed on top of catalyst A in the catalyst basket of the STIRR reactor. This arrangement is equivalent to a bifunctional catalyst containing catalyst A and H-ZSM-5 zeolite.

Catalyst E was tested in carbon monoxide hydrogenation at different weight hourly space velocities. The test results are shown in FIG. 8 and Table C summarises the results of the test at the highest weight hourly space velocity used.

Figure 8:
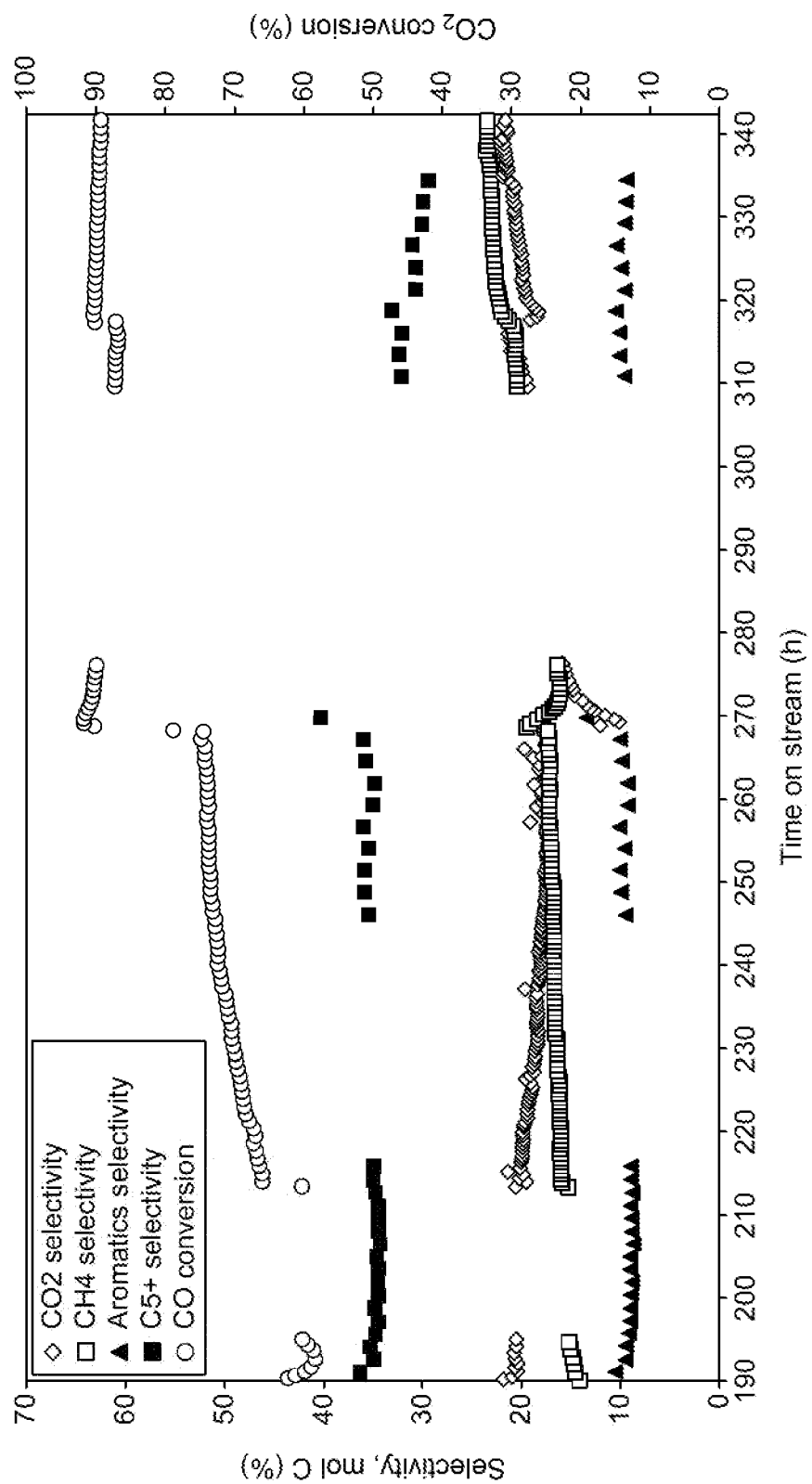
FIG. 8 is a graph showing the conversion and selectivity of a catalyst according to an alternative embodiment of the invention tested in a CO hydrogenation application.

In FIG. 8, catalyst E exhibits a 74.3% carbon monoxide conversion at steady state at a 7800 $h^{-1}$ gas hourly space velocity with a condensate fraction in the products of 43.4% and a C5+ selectivity of 35.9%. The methane selectivity is 19.3%.

TABLE C

| | Cat E |
|---|---|
| GHSV ($h^{-1}$) | 7800 |
| $H_2/(3CO_2 + 2CO)$ | 1 |
| Temperature (K) | 603 |
| Pressure Bar. | 20 |
| CO conversion | 74.3 |
| Selectivity (mol C (%)) | |
| CO2 | 18 |
| C1 | 19.3 |
| C2-C4 | 27.3 |
| C5+ | 35.9 |
| Oxygenates | 0.3 |
| Condensate fraction (%) (C5++ oxyg.)/HC | 43.4 |

Table D is a comparison of the test results in carbon dioxide hydrogenation of catalyst A and catalyst E under the same test conditions. The main differences are in the C5+ selectivity, 21.8% for catalyst A and 30.0% for catalyst E, and in the selectivity to oxygenates, which is 7.6% for catalyst A and 0.9% for catalyst E. The condensate fraction of catalyst E is 49.3% whereas for catalyst A is 45.6%.

From the comparison of the test results can be concluded that catalyst E yields more liquid hydrocarbon product and less oxygenate than catalyst A.

The stability of performance of catalyst E can be seen in FIG. 8, which shows no sign of conversion decay. Typically the acidic function of bifunctional catalyst is poisoned by basic cations migrating from the primary catalyst to the acidic sites of the solid acid catalyst. The constant selectivity to aromatics after 340 hours on stream is evidence that the acidic function remains unaffected due to the absence of migration of group I or group II cations from the primary catalyst. The changes at 268 hours on stream in FIG. 8 are due to the GHSV at this point being changed from 7800 to 1560.

TABLE D

| | Cat A | Cat E |
|---|---|---|
| GHSV ($h^{-1}$) | 7800 | 7800 |
| $H_2/(3CO_2 + 2CO)$ | 1 | 1 |
| Temperature (K) | 603 | 603 |
| Pressure Bar. | 20 | 20 |
| CO2 conversion | 22.1 | 24.2 |
| Selectivity (mol C (%)) | | |
| CO | 35.5 | 37.1 |
| C1 | 9.3 | 12.0 |
| C2-C4 | 25.7 | 20.5 |
| C5+ | 21.8 | 30.0 |
| Oxygenates | 7.6 | 0.9 |

TABLE D-continued

|  | Cat A | Cat E |
|---|---|---|
| Condensate fraction (%) (C5++ oxyg.)/HC | 45.6 | 49.3 |

Table E demonstrates the effect of potassium precipitant in the internal pore structure of the catalyst support framework. CatA was analysed at 19% K and CatA 2880 was analysed at 13% K.

TABLE E

|  | Cat A | Cat A2880 |
|---|---|---|
| GHSV (h$^{-1}$) | 7800 | 7800 |
| H$_2$/(3CO$_2$ + 2CO) | 1 | 1 |
| Temperature (K) | 603 | 603 |
| Pressure Bar. | 20 | 20 |
| CO2 conversion | 22.1 | 6.7 |
| Selectivity (mol C (%)) | | |
| C1 | 9.3 | 26.4 |
| C2-C4 | 25.7 | 12.2 |
| C5+ | 21.8 | 1.5 |
| Oxygenates | 7.6 | 0.0 |
| Condensate fraction (%) (C5++ oxyg.)/HC | 45.6 | 3.8 |
| Chain growth probability | 0.71 | 0.48 |
| Olefinicity ol./(ol. + para.) | 79.8 | 11.4 |

Various modifications may be made within the scope of the invention as herein intended, and embodiments of the invention may include combinations of features other than those expressly claimed herein.

The invention claimed is:

1. A method of preparing a supported catalyst, said method comprising the steps of:
    (i) providing a porous catalyst support comprising an anionic zeolite framework having ion exchange sites defining an ion exchange capacity and having an internal pore structure comprising one or more pores, wherein said internal pore structure comprises a basic precipitant, wherein the basic precipitant comprises cations of a Group I or Group II metal; and said cations are present in the anionic zeolite framework in an excess relative to the ion exchange capacity; and
    (ii) contacting the porous catalyst support in a dry form with a solution or colloidal suspension comprising a catalytically active metal such that, on contact with the basic precipitant, particles comprising the catalytically active metal are precipitated within the internal pore structure of the framework of the porous catalyst support.

2. The method according to claim 1, in which the internal pore structure has one or more regions (cages) that are accessible through lower diameter sections of the pores (windows).

3. The method according to claim 1, in which the porous catalyst support is an aluminosilicate zeolite.

4. The method according to claim 1, in which:
    the catalytically active metal is selected from one or more elements of the group consisting of nickel, cobalt, iron, ruthenium, osmium, platinum, iridium, rhenium, molybdenum, chromium, tungsten, vanadium, rhodium and manganese; and/or
    the supported catalyst comprises Fe, Cu and K.

5. The method according to claim 4, additionally comprising:
    contacting the porous catalyst support with a solution or colloidal suspension comprising one or more metals selected from the group consisting of yttrium, lanthanum, cerium, and any other lanthanide metal, wherein said metals also form part of the catalytically active metal-containing particles; and/or
    contacting the porous catalyst support with one or more elements selected from the group consisting of copper, zinc, gallium, zirconium and palladium, wherein said elements also form part of the catalytically active metal-containing particles.

6. The method according to claim 1, comprising the further step(s) of:
    optionally drying the porous catalyst support comprising the catalytically active metal-containing particles; and/or
    calcining the porous catalyst support comprising the catalytically active metal-containing particles in air; and/or
    chemically reducing the catalytically active metal-containing particles, for example at elevated temperature in the presence of hydrogen gas.

7. The method according to claim 1, in which the basic precipitant is first loaded into the internal pore structure of the porous catalyst support framework.

8. The method according to claim 1, in which the basic precipitant is a carbonate or bicarbonate.

9. The method according to claim 1, in which the porous catalyst support is contacted with a solution or colloidal suspension comprising catalytically active metal using incipient wetness impregnation.

10. The method according to claim 1, in which the supported catalyst is a Fischer Tropsch catalyst.

11. A supported catalyst produced by a method according to claim 1.

12. A method of using the supported catalyst according to claim 11 as a catalyst in a catalysed chemical process.

13. The method according to claim 3, wherein the aluminosilicate zeolite has a silicon to aluminium molar ratio of less than 10.

14. The method according to claim 13, wherein the aluminosilicate zeolite has a silicon to aluminium molar ratio in the range of from 2 to 5.

15. The method according to claim 1, in which the cations are potassium cations.

16. A method according to claim 12, wherein said catalysed chemical process is a Fischer Tropsch process.

17. The method according to claim 2, wherein the particles comprising the catalytically active metal have a larger effective diameter than the windows.

18. The method according to claim 2, wherein the pore diameter, or the diameter of the pore "window" is greater than 0.2 nm.

19. The method according to claim 1, in which the zeolite has a structure which is the FAU, BEA or MWW structure, according to the International Zeolite Association Database of zeolite structures.

* * * * *